(12) United States Patent
Jabbour et al.

(10) Patent No.: US 11,842,382 B2
(45) Date of Patent: Dec. 12, 2023

(54) SYSTEMS AND METHODS FOR INTERFACING WITH POINT-OF-SALE SYSTEMS AND CUSTOMER DEVICES AT AN ESTABLISHMENT

(71) Applicant: App8 Incorporated, Ottawa (CA)

(72) Inventors: Hani Jabbour, Ottawa (CA); Elias Hage, Ottawa (CA); Ahmed Hammad, Ottawa (CA); Ryan Stephen Smith, Ottawa (CA); Farshad Muhammad, Ottawa (CA)

(73) Assignee: APP8 INCORPORATED, Ottawa (CA)

(*) Notice: Subject to any disclaimer, the term of this patent is extended or adjusted under 35 U.S.C. 154(b) by 0 days.

(21) Appl. No.: 17/404,235

(22) Filed: Aug. 17, 2021

(65) Prior Publication Data

US 2021/0374837 A1 Dec. 2, 2021

Related U.S. Application Data

(63) Continuation-in-part of application No. 16/711,924, filed on Dec. 12, 2019, now abandoned.

(60) Provisional application No. 62/778,606, filed on Dec. 12, 2018.

(51) Int. Cl.
G06Q 30/0601 (2023.01)
G06Q 50/12 (2012.01)
G06Q 20/20 (2012.01)
G06Q 20/32 (2012.01)

(52) U.S. Cl.
CPC ....... *G06Q 30/0641* (2013.01); *G06Q 20/202* (2013.01); *G06Q 20/3267* (2020.05); *G06Q 50/12* (2013.01)

(58) Field of Classification Search
CPC ............ G06Q 30/0641; G06Q 20/202; G06Q 20/3267; G06Q 50/12
See application file for complete search history.

(56) References Cited

U.S. PATENT DOCUMENTS 6,473,739 B1 * 10/2002 Showghi .......... G06Q 10/06312
705/5
7,835,949 B2 * 11/2010 Tarvydas ........... G06Q 30/0609
705/26.8

(Continued)

OTHER PUBLICATIONS

Iizuka, Kayo, Takuya Okawada, and Yasuki Iizuka. "Food Product Information Supplement System—Corresponding to Consumer Needs for Shopping and Eating Out." 2011 IEEE International Symposium on Multimedia. IEEE, 2011. (Year: 2011).*

(Continued)

*Primary Examiner* — Asfand M Sheikh
(74) *Attorney, Agent, or Firm* — Sheppard, Mullin, Richter & Hampton LLP

(57) ABSTRACT

The present disclosure provides systems and methods for generating a digital menu for an establishment. In accordance with some embodiments, a system for generating a digital menu for an establishment is configured to: retrieve menu data from a point of sale (PoS) system at the establishment; retrieve supplemental information for the retrieved menu data; generate the digital menu based on the retrieved menu data and the supplemental information; and transmit the digital menu to an electronic device for display to a user.

11 Claims, 19 Drawing Sheets

(56) References Cited

U.S. PATENT DOCUMENTS

| | | | |
|---|---|---|---|
| 7,953,873 B1* | 5/2011 | Madurzak | G06Q 30/02 709/229 |
| 9,117,231 B2* | 8/2015 | Rodgers | G06Q 30/06 |
| 9,159,088 B2* | 10/2015 | Dillahunt | G06Q 30/0261 |
| 2002/0133418 A1* | 9/2002 | Hammond | G06Q 30/06 705/26.8 |
| 2005/0004847 A1* | 1/2005 | Matsuura | G06Q 30/06 705/26.81 |
| 2006/0186197 A1* | 8/2006 | Rosenberg | G06Q 30/00 235/375 |
| 2009/0063274 A1* | 3/2009 | Dublin, III | G06Q 30/0245 705/14.1 |
| 2009/0089149 A1* | 4/2009 | Lerner | G06Q 30/0205 705/7.34 |
| 2010/0010912 A1* | 1/2010 | Jones | G06Q 30/0601 705/26.1 |
| 2010/0332308 A1* | 12/2010 | Yap | G06Q 30/0234 705/17 |
| 2011/0057891 A1* | 3/2011 | Ham | H02J 50/40 345/173 |
| 2012/0233002 A1* | 9/2012 | Abujbara | G16H 20/60 705/15 |
| 2013/0166401 A1* | 6/2013 | Algozer | G06Q 30/06 705/16 |
| 2013/0211814 A1* | 8/2013 | Derks | G06Q 50/12 705/15 |
| 2013/0311311 A1* | 11/2013 | Chopra | G06Q 50/12 705/15 |
| 2014/0058902 A1* | 2/2014 | Taylor | G06Q 30/06 705/26.81 |
| 2014/0257877 A1* | 9/2014 | L'Heureux | G06Q 30/06 705/5 |
| 2015/0046276 A1* | 2/2015 | Artman | G06Q 20/3224 705/21 |
| 2015/0046297 A1* | 2/2015 | Bahrami | G06F 3/0485 705/27.2 |
| 2016/0180311 A1* | 6/2016 | Tung | G06Q 20/202 705/15 |
| 2016/0219398 A1* | 7/2016 | Kamensky | H04W 4/029 |
| 2018/0218414 A1* | 8/2018 | Moghadam | G06Q 30/0283 |
| 2018/0268503 A1* | 9/2018 | Parikh | G06Q 30/0627 |

OTHER PUBLICATIONS

Prathibanandhi, K., et al. "Augmented Reality-Based Restaurants." 2022 International Conference on Power, Energy, Control and Transmission Systems (ICPECTS). IEEE, 2022. (Year: 2022).*

* cited by examiner

FIG. 1 – PRIOR ART

SYSTEMS AND METHODS FOR INTERFACING WITH POINT-OF-SALE SYSTEMS AND CUSTOMER DEVICES AT AN ESTABLISHMENT

CROSS-REFERENCE TO RELATED APPLICATIONS

This application claims the benefit and is a continuation-in-part of U.S. patent application Ser. No. 16/711,924, filed Dec. 12, 2019, which claims the benefit of U.S. Provisional Patent Application No. 62/778,606, filed Dec. 12, 2018, the entire contents of each of which is incorporated by reference herein for all purposes.

TECHNICAL FIELD

The present disclosure relates to interfacing with Point of Sale (PoS) systems and customer devices at an establishment, and in particular for providing menu and billing information to customers on behalf of the establishment.

BACKGROUND

Point of Sale (PoS) systems are used by establishments to track what goods/services customers have ordered and to issue a bill once the customer is ready to pay. Sit-down restaurants or a casual dining restaurant with table service, golf courses, hotel services, etc., are examples of establishments that can utilize PoS systems to associate goods/services with a patron or table during the visit.

FIG. 1 shows a conventional environment for processing customer payments at an establishment. The establishment 100 has an associated PoS system 120 that is used to for tracking customer orders/purchases. Customers 110a-b may order goods/services at the establishment 100, for example by looking at a physical menu and ordering items through an establishment employee 115 (such as a waiter/waitress, bartender, concierge, etc.) at a table 111, who in turn inputs the order of the goods/services into the PoS system 120.

The PoS system 120 typically comprises a user interface for the employee 115 to interact with the system, shown in FIG. 1 as a computer terminal 122, and a processing device, shown in FIG. 1 as a server 124. In some instances the processing device may itself provide the user interface, i.e. the processing device and the user interface are the same computer component. The processing device is capable of processing payments via a payment processor 126, which may be software or computer-executable instructions that are executed by the processing device, or a stand-alone hardware module comprising computer-readable instructions and that executes the payment processing in association with the processing device. The server 124 operates in accordance with PoS configuration files, and information such as menu items that are used by the PoS system 120 may be stored in a PoS database 128 that is operably coupled with the server 124.

When a customer 110a-b wishes to leave the establishment they must settle their bill for the goods/services that were ordered. The establishment employee 115 accesses the PoS system to retrieve the customer's bill, the customer settles their bill through their preferred payment method (e.g. cash, credit card), and the employee 115 returns to the PoS system 120 to close the check. If the customer 110a-b pays with cash, the employee 115 deposits the cash into a cash register associated with the PoS system 120. If the customer 110a-b pays with credit card, the employee 115 brings a payment terminal to the customer 110a-b to facilitate the payment, and the payment terminal communicates with the PoS system 120 to process the payment using the payment processor 126.

Existing techniques for taking orders from customers and processing customer payments at an establishment have several deficiencies, and can result in poor customer experience and less efficient service/establishment operations. One problem is wait time for an establishment employee to take a customer's order, as well as the wait time between the moment one or many customers decided they are finished and wants/needs to leave the establishment and the moment they can actually leave once the bill has been settled. Wait times for patrons are especially caused by waiting for a menu, waiting for the establishment employee to take the customer's order, waiting for a bill, potentially waiting for a payment terminal if a credit or debit card is used to settle the bill, and then paying for the bill. For example, one or more customers may be ready to order but are waiting for the establishment employee to take their order. Further, one or more diners may have finished their dinner but they can't leave their table before waiting for a bill and a terminal to pay the bill or a waiter/waitress to give them back change.

Another problem is having establishment resources, physical and human, tied up due to customers trying to settle their bills. For example in a restaurant while the customers are waiting for their bill at the table, the table is occupied and cannot be cleaned, setup and used for new patrons. Some staff members are also busy printing the bill, and bringing the needed payment terminal or change. This is wasted time delaying table turnover during which the table and the staff member are not generating any business in a time that any profit margin improvement is needed.

Accordingly, systems and methods that enable additional, alternative, and/or improved techniques for providing menu information to customers and for processing customer payments on behalf of the establishment remain highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
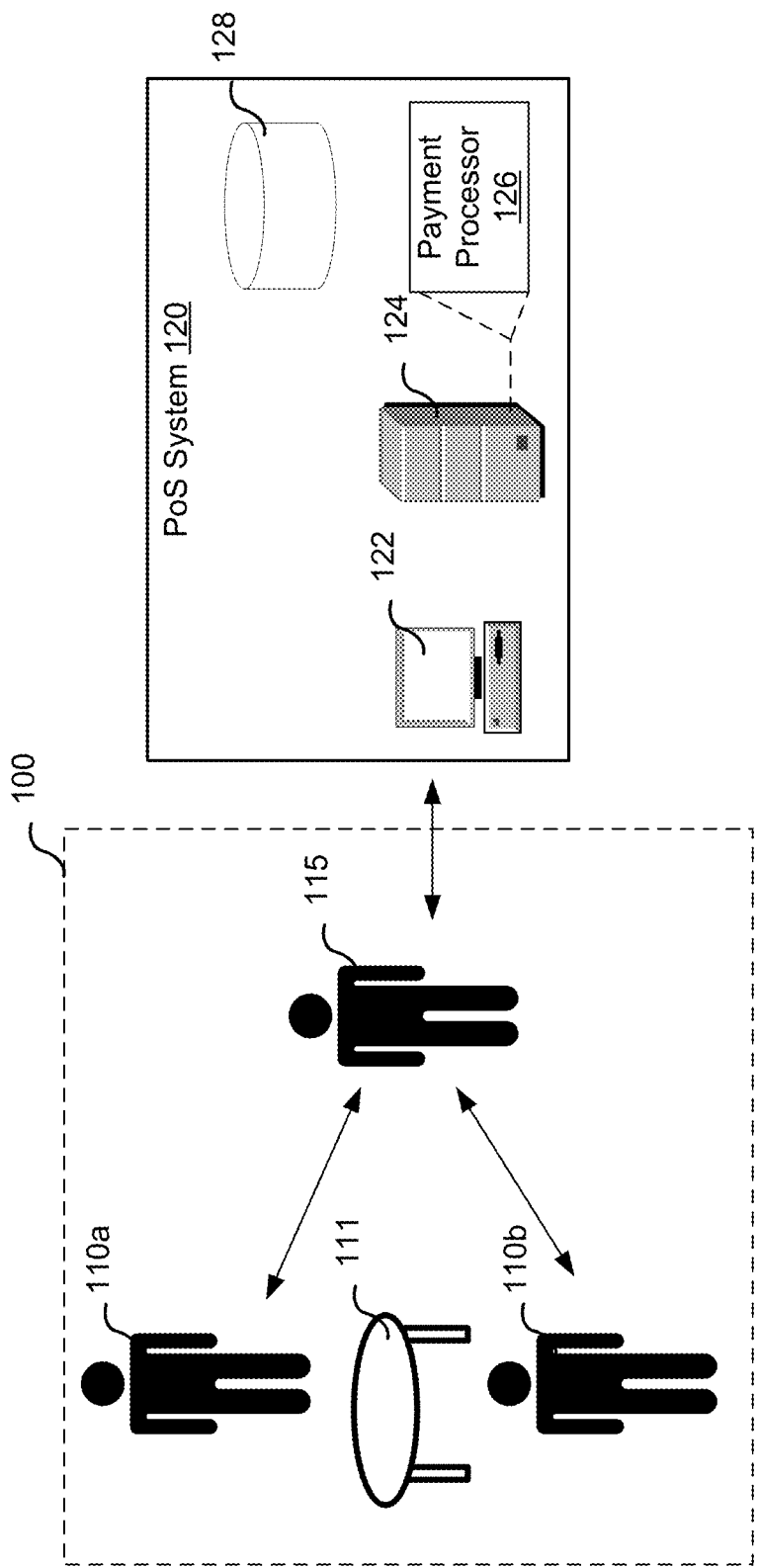
FIG. 1 shows a conventional environment for processing customer payments at an establishment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In accordance with one aspect of the disclosure a server for processing customer payments for a plurality of establishments is disclosed, comprising: a communication interface for communicating via one or more communication networks; a memory storing a plurality of user profiles associated with a corresponding plurality of users using a mobile application, and storing establishment profiles for each of the plurality of establishments; and a processing unit configured to: communicate via the communication interface with an electronic device running the mobile application and associated with a user profile among the plurality of user profiles; communicate via the communication interface with native point-of-sale (PoS) systems located at each of the plurality of establishments remote from the processing unit; and communicate via the communication interface with a payment gateway storing user payment information for each of the plurality of users and storing establishment account information for each of at least one establishment of the plurality of establishments.

In some aspects, the server is distributed in a cloud architecture.

In some aspects, the server is configured to receive check-in data of a user at an establishment from the electronic device through the mobile application.

In some aspects, the check-in data is generated from user input or location data.

In some aspects, the server is configured to remotely open a session for the user in the PoS system of the establishment that allows for goods/services ordered by the user at the establishment to be associated with the user.

In some aspects, the server is configured to retrieve session information from the PoS system of the goods/services ordered by the user at the establishment.

In some aspects, the server retrieves the session information in response to user input or from location data indicating that the user has left the establishment.

In some aspects, the server is configured to settle a bill for the goods/services ordered by the user at the establishment by instructing the payment gateway to charge the user a payment to settle the bill and to deposit the payment in an account for the establishment.

In some aspects, the server is configured to: receive a request through the mobile application on the electronic device of a user to settle a bill and information identifying a user's location at an establishment; retrieve session information from the PoS system for sessions associated with the user's location, and provide the session information to the electronic device of the user; receive an indication through the mobile application on the electronic device of the user of a session corresponding to the bill; and instruct the payment gateway to charge the user a payment to settle the bill and to deposit the payment in an account for the establishment.

In some aspects, the information identifying the user's location at the establishment is generated from the user scanning or tapping identification equipment at the establishment using the mobile application.

In some aspects, the server communicates with the native PoS system using one or more APIs for respective PoS systems.

In accordance with another aspect of the present disclosure, a method of processing customer payments for a plurality of different establishments is disclosed, comprising: receiving a request from a mobile application on an electronic device of a user to settle a bill at an establishment; identifying a user profile corresponding to the user and an establishment profile corresponding to the establishment; retrieving session information from a point-of-sale (PoS) system of the establishment indicative of a bill of goods/services ordered by the user at the establishment; and instructing a payment gateway, according to the user profile and the establishment profile, to charge the user a payment to settle the bill and to deposit the payment in an account for the establishment.

In some aspects, the method further comprises: receiving check-in data of the user at the establishment from the electronic device through the mobile application; and remotely open a session for the user in the PoS system of the establishment that allows for the goods/services ordered by the user at the establishment to be associated with the user.

In some aspects, the check-in data is generated from user input or location data.

In some aspects, the received request to settle the bill is generated in response to user input or from location data indicating that the user has left the establishment.

In some aspects, a session is opened for the user in the PoS system is associated with an application tag for the user, and wherein the received request to settle the bill comprises the application tag.

In some aspects, the method further comprises receiving information identifying a user's location at the establishment, and wherein retrieving the session information from the PoS system comprises: retrieving session information from the PoS system for sessions associated with the user's location; providing the session information to the electronic device of the user; and receiving an indication through the mobile application on the electronic device of the user of a session corresponding to the bill.

In some aspects, the information identifying the user's location at the establishment is generated from the user scanning or tapping identification equipment at the establishment using the mobile application.

In accordance with a further aspect of the present disclosure, an integrative point-of-sale (PoS) system for an establishment is disclosed, comprising: an interface for receiving an input of goods/services ordered by customers of the establishment; and a server for processing customer payments for the establishment, comprising: a communication interface for communicating via one or more communication networks; a memory storing a plurality of user profiles associated with a corresponding plurality of users using a mobile application associated with the establishment; and a processing unit configured to: receive the input of the goods/services ordered by customers; and where a customer is a user of a mobile application: communicate via the communication interface with an electronic device of the user running the mobile application; retrieve a user profile from the memory corresponding to the user; and communicate via the communication interface with a payment gateway storing user payment information for each of the plurality of users to instruct the payment gateway to charge the user a payment to settle a bill for the goods/services ordered by the user.

In some aspects, the processing unit is further configured to process customer payments using traditional payment techniques when requested by a user of the mobile application and for customers who are not a user of the mobile application.

Another general aspect includes a system for generating a digital menu for an establishment, comprising: a communication interface for communicating via one or more communication networks; a processing unit; and a memory storing non-transitory computer-readable instructions which, when executed by the processing unit, configure the system to: communicate via the communication interface with an electronic device of a user; communicate via the communication interface with a point-of-sale (PoS) system located at the establishment remote from the processing unit; and in response to a trigger to generate the digital menu of the establishment, retrieve menu data from the PoS system at the establishment; retrieve supplemental information for the retrieved menu data; generate the digital menu based on the retrieved menu data and the supplemental information; and transmit the digital menu to the electronic device for display to the user.

Implementations may include one or more of the following features. The system where the trigger to generate the digital menu is a request for the digital menu received from the electronic device of the user. The system where the trigger to generate the digital menu is an expiry of a predetermined time period since the digital menu was previously generated. The system where the menu data from the PoS system is stored locally at the system, and where the system is further configured to determine if there has been a change in the menu data at the PoS system relative to the menu data from the PoS system that is stored locally. The system where if there is no change in the menu data at the PoS system, retrieving the menu data from the PoS system includes retrieving the menu data that is stored locally. The system where if there is a change in the menu data at the PoS system, retrieving the menu data from the PoS system includes retrieving the menu data stored at the PoS system. The system where the supplemental information is provided by a client of the system. The system where retrieving the supplemental information includes retrieving the supplemental information from one or more external data sources. The system where the system is further configured to receive a user order from the electronic device via the digital menu, and is configured to update the PoS system directly with the user order. The system where the system is further configured to receive location information associated with the user order identifying at least one of a table number and a seat number of the user, and updating the PoS system with the user order includes associating the at least one of the table number and the seat number of the user with the user order. The system where the system is further configured to receive a request from the electronic device of the user to settle a bill for the user order; to identify a user account corresponding to the user and an establishment account corresponding to the establishment; to retrieve session information from the PoS system at the establishment indicative of the bill for the user; to receive an indication of a payment method from the electronic device of the user; to determine if the payment method is accepted by the establishment based on the establishment account; and to process the payment from the user to the establishment with the payment method when it is determined that the payment method is accepted by the establishment.

Another general aspect includes a method of generating a digital menu for an establishment, comprising: retrieving menu data from the PoS system at the establishment; retrieving supplemental information for the retrieved menu data; generating the digital menu based on the retrieved menu data and the supplemental information; and transmitting the digital menu to the electronic device for display to the user.

Implementations may include one or more of the following features. The method further including receiving a trigger to generate the digital menu, where the trigger is a request for the digital menu received from the electronic device of the user. The method further including receiving a trigger to generate the digital menu, where the trigger is an expiry of a predetermined time period since the digital menu was previously generated. The method where the menu data from the PoS system is stored locally, and the method further includes determining if there has been a change in the menu data at the PoS system relative to the menu data from the PoS system that is stored locally. The method where if there is no change in the menu data at the PoS system, retrieving the menu data from the PoS system includes retrieving the menu data that is stored locally. The method where if there is a change in the menu data at the PoS system, retrieving the menu data from the PoS system includes retrieving the menu data stored at the PoS system. The method where the supplemental information is provided by a client. The method where retrieving the supplemental information includes retrieving the supplemental information from one or more external data sources. The method further including receiving a user order from the electronic device via the digital menu, and updating the PoS system directly with the user order. The method further including receiving location information associated with the user order identifying at least one of a table number and a seat number of the user, and updating the PoS system with the user order includes associating the at least one of the table number and the seat number of the user with the user order. The method further including receiving a request from the electronic device of the user to settle a bill for the user order; identifying a user account corresponding to the user and an establishment account corresponding to the establishment; retrieving session information from the PoS system at the establishment indicative of the bill for the user; receiving an indication of a payment method from the electronic device of the user; determining if the payment method is accepted by the establishment based on the establishment account; and processing the payment from the user to the establishment with the payment method when it is determined that the payment method is accepted by the establishment.

Another general aspect includes a method of processing a customer payment for an establishment, comprising: receiving a request from an electronic device of a user to settle a bill for a user order; identifying a user account corresponding to the user and an establishment account corresponding to the establishment; retrieving session information from a point of sale (PoS) system at the establishment indicative of the bill for the user; receiving an indication of a payment method from the electronic device of the user; determining if the payment method is accepted by the establishment based on the establishment account; and processing the payment from the user to the establishment with the payment method when it is determined that the payment method is accepted by the establishment.

Implementations may include the method where processing the payment comprises looking-up a real-time market price or exchange rate of an asset indicated by the payment method.

Implementations of the described techniques may include hardware, a method or process, or computer software on a computer-accessible medium. Other embodiments of this aspect include corresponding computer systems, apparatus, and computer programs recorded on one or more computer storage devices, each configured to perform the actions of the methods.

The present disclosure provides systems and methods for providing menu information to customers at an establishment, and for processing customer payments for an establishment. In accordance with some embodiments, a server for processing customer payments for one or more establishments is able to connect to and interface with various establishments' PoS systems (including multiple different kinds of PoS systems) through a network (e.g. the Internet), remotely using cloud application program interfaces (APIs) of the PoS systems, for retrieving menu information, placing customer orders, and retrieving customer sessions. The server is also configured to connect through the Internet to a payment gateway, which may be a software-as-a-service that is remotely available through APIs, for processing customer payments on behalf of an establishment, such as a restaurant. The server configuration provides flexibility for presenting menu information to the customer, taking orders from customers and updating the PoS system directly, retrieving the goods/services ordered by the customer at the establishment from the PoS system, processing a payment for the goods/services on behalf of the establishment through the payment gateway, and settling/closing the customer's bill at the establishment, without any intervention from an establishment employee. This improves both customer experience by reducing/removing wait times for a customer to order menu items and to settle their bill, and also allows for improved efficiency at the establishment by giving the employee more time for other tasks. In accordance with the embodiments of the present disclosure, the server can interface with native PoS systems without requiring additional hardware solutions to be implemented at an establishment or on the PoS systems (which is both costly and may otherwise require additional employee training). In addition cloud integration helps make the system catastrophe resistant and enables easy migration to different PoS systems.

In accordance with some embodiments, a user, using a mobile device for example, may download an application that communicates with the server. When a user visits an establishment, they can check into the establishment using the application which can be provided to the PoS system. The user can then introduce themselves to the establishment employee and identify that they are using the application. The server is configured to remotely open a session with the native PoS system or to join the user to an already-opened session. The session can be associated with a table or location where the user is. When the user orders goods/services, the establishment employee can input orders into the native PoS system as usual into the open session associated with the customer, identifiable for example by the user's name. When the user of the application, who is a customer of the establishment, wishes to settle their bill and leave, the user may use the application to view and pay for their bill In restaurants, for example, the embodiments disclosed herein allows customers to walk into a restaurant and be presented with a digital menu via an application, order food, eat, and then use the application to pay for their bill and walk out of the restaurant. In the event of a walkout, where a user intentionally leaves the restaurant or forgets to pay the bill by mistake, the embodiments disclosed herein can initiate the bill settlement automatically within a configured amount of time and/or when the customer is a certain distance from the restaurant or at a specific time at night when the restaurant closes.

In other embodiments, a customer of the establishment does not necessarily have to check-in using the application before a PoS system session is opened, or even use the application at all. Location identification can be provided by near field communication (NFC) tags, Bluetooth™ Low Energy (BLE) transmitters, QR™ or barcodes may be dispersed within the establishment at locations associated with PoS system sessions. For example, in a restaurant setting such identification equipment may be arranged at each table. When a user of the application wishes to check-in or to settle their bill at the end of their meal, they may load the app on their mobile device, tap the NFC card or scan the QR code, and view a digital menu and/or select their bill. The remote server knows which table to retrieve the bills from because the table is associated with the identification equipment, and all bills for the table are presented to the user for selection. Once the user selects their bill, the server can process payment using payment information stored for the user. Additionally or alternatively, a customer need not even be using the application, but rather can open a web page on their device, tap or scan the identification equipment, view the digital menu and/or select their bill, and enter their order and/or payment information. Alternatively geo-location services may be utilized to identify the establishment and the user may select their seating position or table to be associated with their bill.

Some of the advantages of the embodiments disclosed herein may increase exponentially with the number of people that are around the same table. With many people around the same table, one or more users can settle their bills simultaneously and all leave the restaurant within seconds of finishing their meals.

The embodiments disclosed herein may also apply at golf courses where the golfers can view a digital menu and order drinks throughout their round and use the application to pay whenever they are done and ready to leave without having to worry about spending time to pay every time the drinks cart delivers the drinks or spending time at the end once they are done the round to go up to the staff and settle their bill. The automatic bill settlement also applies.

In stadiums, for example, where lines may be long and get very busy during halftimes or breaks, the disclosed systems and methods can help to streamline the ordering process and payment action and allow the staff to focus on serving the clients and save precious seconds for each person in line. In accordance with the embodiments disclosed herein patrons can order ahead, walk up, grab their purchases, and leave. The payment can be manually or automatically settled.

Other establishments like nail salons, for example, may take advantage of the automatic payment feature. The customers do not need to reach to their wallets to pay, they can just walk out of the salon and the systems and methods disclosed herein can ensure that the bill is settled without risking ruining the fresh coat of nail polish.

Additional advantages and flexibility provided for by the systems and methods described herein are attainable and are further described below. Embodiments are described below, by way of example only, with reference to FIGS. 2-15.

Figure 2:
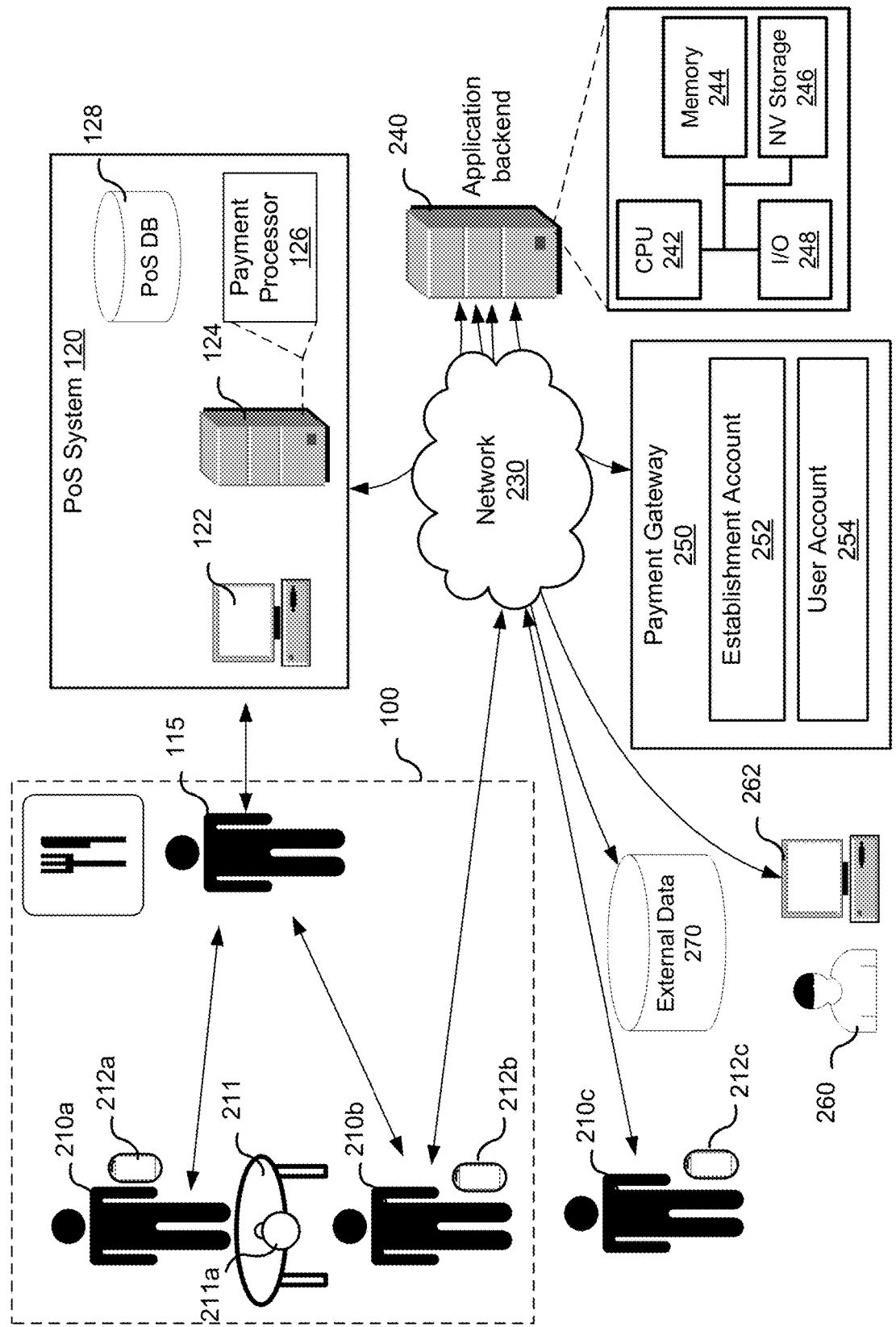
FIG. 2 shows a representation of a system for remotely processing customer payments for a user at an establishment in accordance with the present disclosure.

FIG. 2 shows a representation of a system for remotely processing customer payments for a user at an establishment in accordance with the present disclosure. Similar to FIG. 1, customers 210a-b may sit at a table 211 and order goods/services at the establishment 100. The establishment 100 is associated with the same ("native") PoS system 120 for tracking customer orders/purchases. Customers 210a-b may order goods/services at the establishment 100, for example through the establishment employee 115 who in turn inputs the order/purchase of the goods/services into the PoS system 120, or through a digital menu as discussed below.

Some or all of the customers 210a-b may have an electronic device 212a-b running a mobile application that is supported by and communicates with application backend 240 through a network 230 (e.g. the Internet). Users of the mobile application may also include a user 210c with electronic device 212c who is not currently at the establishment 100. The application backend 240 also communicates and interfaces with the native PoS system 120 of the establishment 100 through the network 230, and with a payment gateway 250 which may be operated by a third party, through the network 230, for processing customer payments for the establishment 100.

The application backend 240 may comprise a processing unit, e.g. central processing unit (CPU) 242, a memory 244, non-volatile storage 246, and an input/output interface 248. The input/output interface 248 provides a communication interface that allows for communicating with electronic devices running the mobile application, the PoS system 120, and the payment gateway 250 via one or more networks. The memory 244 and/or non-volatile storage 246 may store a plurality of user profiles associated with a corresponding plurality of users that are using the mobile application. The memory 244 and/or non-volatile storage 246 may also store an establishment profile for the establishment 100. The memory 244 and/or non-volatile storage 246 may further store multiple APIs for communicating and interfacing with the PoS system 120 and PoS systems from different manufacturers.

The processing unit 242, which is configured to execute computer-readable instructions stored on a non-transitory computer-readable memory (e.g. the memory 244) of the application backend 240 for processing customer payments, is configured to communicate with the electronic devices 212a-c running the mobile application, communicate with the native PoS system 120 using APIs for the PoS systems, and communicate with the payment gateway 250 for settling customer payments.

The payment gateway 250 stores establishment account information 252 for the establishment 100 comprising information that allows the customer's payment to be deposited into an establishment's account. The payment gateway 250 also stores user account information 254 comprising user payment information that allows for the user to be charged a payment amount to settle a bill for the goods/services ordered at the establishment 100. In accordance with some embodiments, if the payment gateway 250 is operated by a third party, no financial information of either the application users or the establishments associated with the application backend are maintained at the application backend. In accordance with other embodiments as described further herein, the payment gateway 250 may be operated by the application backend 240.

When customers 210a-b that are using the mobile application supported by the application backend 240 on the electronic devices 212a-b enter the establishment, the application backend 240 may determine that the users have checked-in at the establishment. The determination may be made by the user indicating using the mobile application that they have checked-in the establishment. The determination may also or alternatively be made by tracking a location of the electronic devices 212a-b and determining that the user has been at the establishment for a predetermined threshold of time. The determination may still further be made by determining that the electronic device of the user has connected to the establishment's Wi-Fi™ or other network, for example or global positioning system (GPS) location or Bluetooth Low Energy (BLE) beacon can be used to determine the location of the device. The application backend 240 opens a session for the customers 210a-b within the PoS system 120 of the establishment.

The customers 210a-b sit at table 211 and the establishment employee 115 takes their order. The customers 210a-b simply have to introduce themselves by their names and indicate that they are using the mobile application. When the employee 115 returns to the PoS system 120 to input the customers' orders, they can be entered into the open sessions associated with the user's names that were created by the application backend. Each session may be associated with a user's application tag for use by the application backend 240 to correlate the session with the user's profile, and a check ID/seat number for use by the establishment employee to enter the order information. In some embodiments, the user can also be added to a session that is already open—for example if customers are going to split a bill for the goods/services ordered, several users may be added to the same session. A group of customers associated with a session may consist of customers that are all users of the mobile application, or may comprise both customers that are users of the mobile application as well as customers that are not. Alternatively the seating positions may be associated with individual users associated with a table.

Additionally or alternatively, the application backend 240 may also be configured to retrieve menu information from the PoS system 120 and present such menu information including but not limited to the menu items, names, descriptions, prices, dependencies, combos, options, add-ons, as well as any other relevant information on the PoS. Menu information is already configured and already exists in one way shape or form on the PoS systems, which may for example be stored in the PoS database 128 of the PoS system 120. These PoS menu configurations typically already have a lot of information that the establishment owners have already configured and spent months perfecting, like a list of items, item groups, different options, add-ons, combos, dependencies, descriptions and pricing, among other things. However, these PoS menu configurations are currently not customer facing, but are rather on the PoS for the employee's use. The PoS menu configurations also typically do not contain the relevant information to function as a digital menu. For example, the PoS menu systems typically have no opening and closing times, they may or may not have pictures, they may contain many old items and information that are no longer in use that do not bother the waiter but cannot be displayed to the user, etc. Further, the PoS menu systems are not easily modifiable and do not have the ability to convey changes in real-time to the end user (i.e. the customer).

In accordance with the embodiments of the present disclosure, the application backend 240 may retrieve information from the PoS menu configuration for generating a digital menu that can be presented to the user. The PoS menu configuration may be retrieved by using API calls to the PoS system 120, directly accessing the PoS database 128 associated with the PoS system 120, or a combination thereof, and the application backend 240 can generate a real-time digital menu for presentation within the application on the customer's device by combining the information from the PoS menu configuration with complimentary information for a digital menu. For example, the application backend 240 may retrieve the list of items with descriptions and prices from the PoS system 120, and compliment this information with item pictures, alcohol warning and restrictions, allergy warning, ingredient labeling, and opening and closing times for the menu. In some aspects, the application backend 240 may provide establishments with a configuration panel that can be accessed by an operational manager 260 using client computing device 262 via network 230, which allows the establishment to input relevant information for generating the dynamic menu and to provide input on what information is presented. Additionally or alternatively, the application backend 240 may retrieve such complimentary information from one or more external data sources 270 such as via webpages on the Internet. As one example, an establishment may list specialty desserts on their menu that change every few weeks, and in one instance the dessert may contain alcohol. In this case, the client can access the configuration panel to input that the menu display a warning that the specialty dessert contains alcohol.

Thus, the application backend 240 can operate in a symbiotic relationship with the PoS system 120 to generate an always up-to-date, real-time, complete digital menu that serves as a user facing interface to view and/or order from. In this embodiment, a customer 210a-b at an establishment can order directly from the digital menu, and/or a customer 210c not currently at the establishment (e.g. at home) can order from the digital menu (e.g. for pickup or delivery).

During the course of the users' visit at the establishment 100, customers 210a-b may be able to view the items that they have ordered and which have been inputted into the PoS system 120. The application backend 240 can make an API call to the PoS system 120 to retrieve the goods/services attributed to the user's session, and provide this information to the customers 210a-b through the mobile application. Accordingly, if there is an error in the goods/services attributed to a user, the customer can promptly notify the employee 115 well before a bill is printed at the end of the visit.

When the customers 210a-b are finished with their stay at the establishment (e.g. if the establishment is a restaurant, finished their meal) and wish to leave, they may initiate bill settlement through the mobile application. For example, the customer may make an indication through the mobile application that they wish to settle their bill. Additionally or alternatively, the customer may simply leave the establishment and when a location of the electronic device indicates that the user has been outside a geo-fence of the establishment for a predetermined threshold amount of time, or outside a geo-fence of the establishment and a predetermined amount of time has passed since the user last ordered, the application may determine that the user has left the establishment and initiates the bill settlement. The geo-fence for the establishment and/or the threshold amount of time may be generic, or may be specifically configured for the establishment and stored with the establishment profile.

To settle the bill, the application backend 240 makes an API call to the PoS system 120 to retrieve the goods/services ordered by the user while at the establishment. The application backend 240 then instructs the payment gateway to charge the user a payment for the goods/services to settle the bill and to deposit the payment in the corresponding establishment account. The payment charged to the user may be in excess of the amount required to settle their bill in order to pay a fee to the providers of the application backend and/or the payment gateway. Likewise, the payment deposited into the establishment account may be less than the amount required to settle the bill in order to pay a fee to the providers of the application backend and/or the payment gateway.

In another embodiment, the application backend 240 can support bill payments even without the customers' checking-in at the establishment. For example, the establishment may be provided with various identification equipment, such as NFC tag, QR code, or barcode 211a, which can be associated with a location in the establishment 100, such as the table 211, that is associated with PoS systems sessions. Instead of a user checking-in and the application backend 240 opening a session at the PoS system for the user, the employee 115 may open sessions and enter orders in the PoS system 120 as usual, and only when the customer wishes to settle their bill would the application backend 240 find the session for the customer.

In one example, the customer 210a-b may be running the mobile application on their electronic device (smartphone) 212a-b, and when they wish to settle their bill they open the application and tap the NFC tag 211a using their device (other types of identification equipment are also possible, including but not limited to print-outs with QR codes or barcodes, etc.). The application backend 240, based on the location associated with the identification equipment, can query the PoS system 120 to retrieve checks for the table 211 of the establishment. The user may then select their bill using the mobile application and initiate bill settlement. The application backend 240 then instructs the payment gateway to charge the user a payment for the goods/services to settle the bill and to deposit the payment in the corresponding establishment account. In another example, one or more of the customers 210a-b may not have downloaded the mobile application on their electronic device 212a-b. However, the customers may be directed to a webpage and when they wish to view or settle their bill, they can tap the NFC tag 211a using their device. The application backend 240 may host or be configured to receive information from the webpage, and based on the location associated with the identification equipment, queries the PoS system 120 to retrieve checks for the table 211 of the establishment. Within the webpage on their device, the customer may select their bill and enter payment information. The application backend 240 instructs the payment gateway to charge the customer using the payment information provided. Payment may also utilize payment systems such as Apple Pay™, Google Pay™, Samsung Pay™, Venmo™, Interac™ or other $3^{rd}$ party electronic payment applications.

Additionally, a user upon being seated may scan the identification equipment 211a, which has location information (such as a table number), and the user may be presented with the digital menu based on information retrieved from the PoS menu configuration as discussed above. The user can now order directly from the digital menu to their exact table number and seat, and the application backend 240 can open a session and enter orders directly in the PoS system 120. That is, unlike traditional online menu ordering, the application backend 240 facilitates information between the customer device directly to the PoS, and thus provides integrated-to-the-PoS, to-your-seat ordering.

In the system configuration as described above, the application backend 240 is able to interface with the native PoS system 120 without requiring any hardware modifications to the PoS system 120 at the establishment. Accordingly, payments by customers who are not users of the mobile application and/or do not wish to pay via the webpage may be processed using existing techniques with no change in the procedures of the establishment's employees (e.g. processing credit card payments using a payment terminal and the payment processor).

Additionally, the application backend 240 is able to remotely process customer payments on behalf of the establishment, which may help to provide improved customer experience and reduce tasks needed to be performed by the employee 115. The application backend 240, being remote from the PoS system 120 and establishment 100, e.g. distributed in a cloud architecture, also helps to improve the reliability of processing customer payments. For example, in the event of a minor or catastrophic situation at the establishment 100 such as a fire, flood, electrical outage, etc., customer payments can still be processed on behalf of the establishment for those customers who are users of the mobile application.

Although only one establishment 100 and PoS system 120 is shown in FIG. 2, a person skilled in the art would appreciate from the disclosure herein that the configuration and cloud-integration of the application backend 240 allows for processing customer payments for multiple establishments, each having respective PoS systems, including PoS systems running different APIs. The APIs may be selected during configuration or dynamically determined by the application backend for each associated PoS system.

The application backend 240 can use a set of APIs that can be conformed to different APIs for the various PoS systems with which the application backend interfaces with. In some embodiments, the application backend 240 may communicate with the PoS system through some or all of the following APIs: Create Check, AddGuestToCheck, GetGuestItems, GetChecksByTable, and MakePayment for each specific PoS manufacturer. The CreateCheck API may be used to create a check in the PoS and returns a Check Identifier. The Check will have a seat or a guest that will have an item or an attribute that represents the user's application Tag. The AddGuestToCheck API may be used where the PoS supports multiple guests on the same check to allow a guest to be added to a new seat on the that Check. The new seat or guest will have an item or an attribute that represents the user's application Tag. The GetGuestItems API may allow for querying/retrieving from the PoS the item list that were ordered by the person represented by a particular application tag and/or a particular check id and a seat number. The GetChecksByTable API may allow for querying/retrieving from the PoS the checks for a particular table/location (e.g. where an application tag or particular check id/seat number is not known). The MakePayment API may be used to mark that a payment is made with the specified amount against the check and seat of the person that is represented by the user's application Tag, or alternatively mark that a payment is made with the specified amount against the check id and seat number.

The functionality of the application backend 240 is also not limited to that which has been described above and the application backend may be configured to provide further services to the establishment 100 and the users of the mobile application.

For example, the application backend 240 may provide for display in the mobile application a list of nearby restaurants based on the user location that are participating with the application backend 240.

The application backend 240 may also be able to notify users of the mobile application for various reasons. As an example, the user 210c may be notified when they approach the establishment 100 that it is a participating establishment.

The application backend 240 may be configured to apply automatic discounts to a user's bill and make sure that it is reflected in the PoS. For example a $5 discount may be applied every time a user spends more than $20 at a specific establishment. This can be configurable by the establishment owners to allow them to create promotions easily and apply them automatically without any effort from the staff. An ApplyDiscount API may be utilized to apply a percentage or an amount discount to a session associated with a user's application tag or with the check ID and the seat number. Further, if an establishment is offering discounts to a certain demographic, organization or group (e.g. people living within a certain geographic area, companies, or sports teams), the application backend 240 can determine whether to apply this discount based on information known about users. The application backend can also pre-populate user accounts whereby if a new user that is part of the target demographic signs up for an account using the application then the discount is already associated with their account.

Additionally, given a set of conditions a note can be added in the PoS on a specific check. For example a note to add a 'nachos' on the table every time all the application users on a table that collectively spend more than $20 at a specific establishment. This can be configurable by the restaurant owners to allow them to help the staff remember to apply certain promotions.

Further, the application backend may feed transaction data into an analytics engine to analyze data for the establishment. The analytics may be particularly relevant to data generated from users of the application, but some analytics can also be obtained from transaction data of customers' who choose to settle their bills through the webpage. The analytics may be reported to the establishment to provide information on metrics such as: revenue, number of guests, transactions over time, average time spent at restaurant, average tip, average bill amount, top ordered items, transactions per day, transactions per week, dollars per day, dollars per hour, etc. Predictive analytics may also be used to provide the establishments with data analysis that allows them to improve their sales and insight into the health of the business that can provide explanations on certain criteria through Anomaly Detection algorithms. User data may also be correlated across different restaurants as long as there is no sharing of direct restaurant or user data across unrelated restaurants. The anomaly detection algorithms can be used to identify problems with a menu item, problems with a particular time of day, problems with a waiter/waitress, etc. The analytics engine may also provide actions that the establishments can take based on the analysis, for example, change item price, remove item, let go of a waiter, open later, close earlier, close later, etc. Moreover, guest behaviour can be predicted and actions can be provided to the establishment that may help to improve the restaurant's business through algorithms that do Sentiment analysis and Forecasting, such as predicting when the guest is going to visit next, what items the customer is likely to order next time they visit, how much would the guest pay, etc. Further, the analytics engine can determine actions that the establishment can take base on the predicted guest behaviour, such as who to target (based on item preference, expected visit date, expected spend), what to target them with, when to target, etc. For example, the analytics engine may identify the correlation between different menu items to allow the staff to successfully upsell. For instance it may be detected that there is a high probability a user gets a brownie for dessert when a user orders a chicken burger. A restaurant may be provided with that information so that they can instruct their staff to suggest the brownie every time a person orders a chicken burger to get a more successful up-sell.

In still a further embodiment, the outputs from the analytics engine can be provided through the application backend to the PoS system directly. For example, the analytics engine may determine that user A typically orders a salad at restaurants that they visit. When the user checks-in at an establishment, this insight of the user's preference to eating salad may be provided to the employee of the establishment, better allowing them to prepare in advance for their interaction with the customer and possible questions that may be asked or with recommendations.

It is believed that a person skilled in the art would readily appreciate that the configurability and flexibility provided by the systems and methods disclosed herein offer many advantages, and that the systems and methods may be used to provide further functionality without departing from the scope of this disclosure.

Additionally, while FIG. 2 shows the application backend 240 being remote from the PoS system 120 and connected through network 230, in some embodiments the processing device of the PoS system (e.g. server 124) may be replaced or complimented by the application backend 240. That is, an integrative PoS system for an establishment may be implemented at the establishment. While some advantages described in the configuration of FIG. 2 are attained by having the application backend 240 remote from the PoS system, much of the functionality of the application backend 240 as described can also be provided by such an integrative PoS system for an establishment and certain advantages (such as a user being able to initiate bill settlement through an application without notifying the establishment employee, for example) can still be attained. An integrative PoS system may be implemented where an establishment wishes to have a dedicated mobile application. In comparison, having the application backend 240 remote from the PoS system 120 and configured to interface with many PoS systems of different establishments as described with reference to FIG. 2 may support a single application that the different establishments participate with. The methods described with regards to FIGS. 3 thru 11 may be relevant to both a system comprising the application backend 240 as well as an integrative PoS system.

Figure 3A:
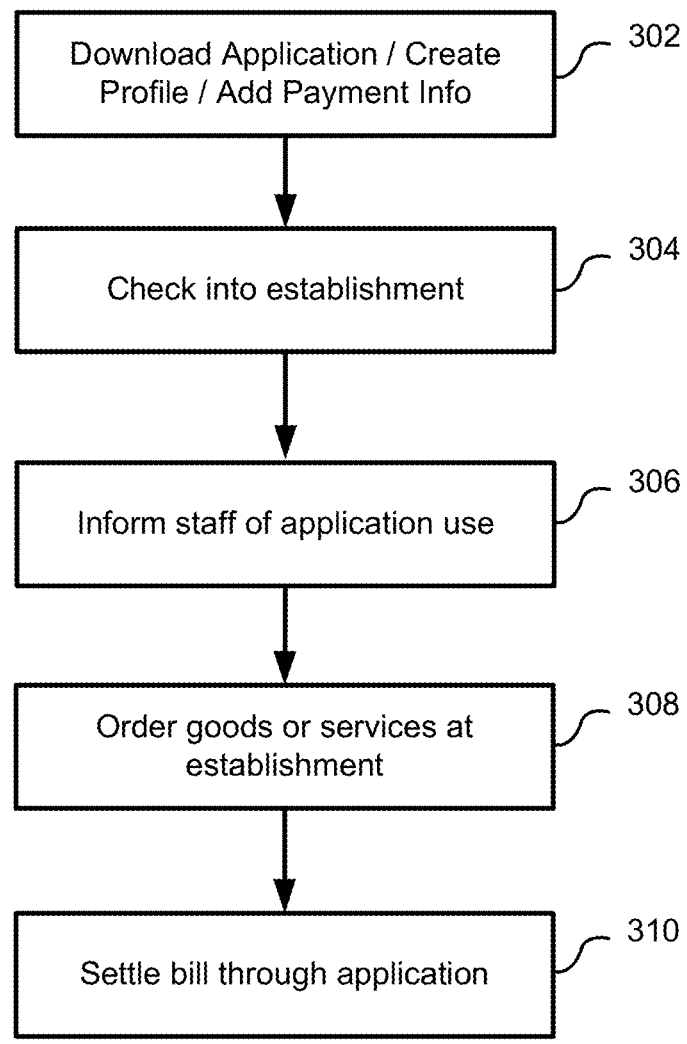
FIGS. 3A and 3B show methods of how a user uses a mobile application for making payments.
Figure 3B:
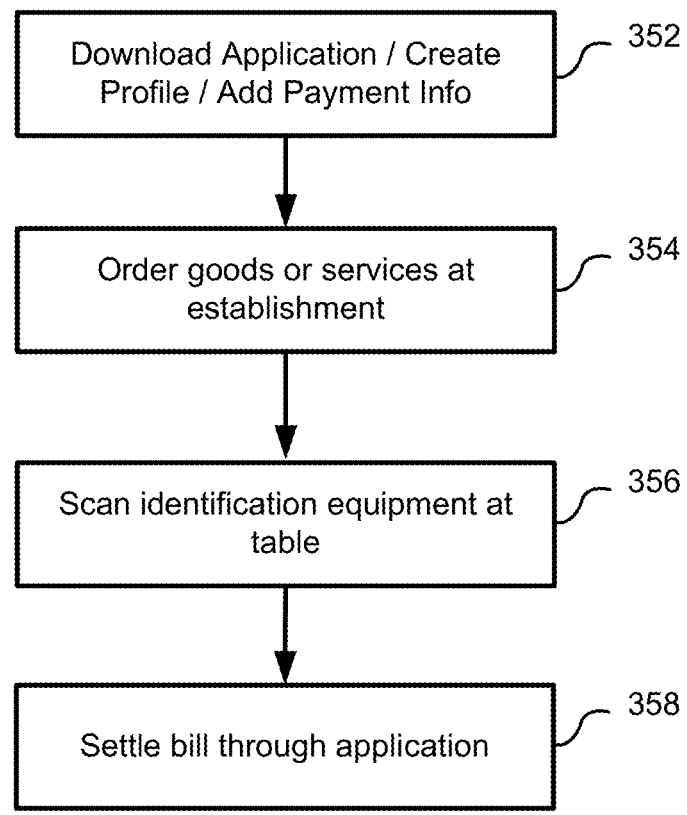

FIGS. 3A and 3B show methods of how a user uses a mobile application for making payments. In FIG. 3A, a user downloads the mobile application and creates a user profile, which involves adding payment information (302). The user checks into an establishment that is participating with the mobile application (304). As described with reference to FIG. 2, the application backend 240 may have stored, in memory, an establishment profile for the establishment and the payment gateway may store establishment account information. As also described with reference to FIG. 2, the user checking into the establishment may be determined for example by the user indicating using the mobile application that they have checked-in; a location of the user as received from the mobile application indicating that the user has been at the establishment by location information for a predetermined threshold amount of time; and/or the user's device connecting to a local network of the establishment.

The user of the application informs the establishment staff that they are using the application (306). The user orders good/services at the establishment (308). The user settles their bill through the application (310). As described with reference to FIG. 2, the user may indicate that they wish to settle their bill by indicating, using the mobile application, that they would like to settle the bill. Additionally or alternatively, the user may simply leave the establishment and bill settlement can be initiated when a user has been outside a geofence of the establishment for a predetermined threshold amount of time, or outside a geofence of the establishment and a predetermined amount of time has passed since the user last ordered.

In the method shown in FIG. 3B, a user can settle their bill without checking into the establishment prior to ordering. A user downloads the mobile application and creates a user profile, which involves adding payment information (352). The user orders good/services at the establishment (354). When the user has finished their meal and wishes to initiate bill settlement, they may scan or tap identification equipment located where they are seating (356). The user settles their bill through the application (358).

Figure 4:
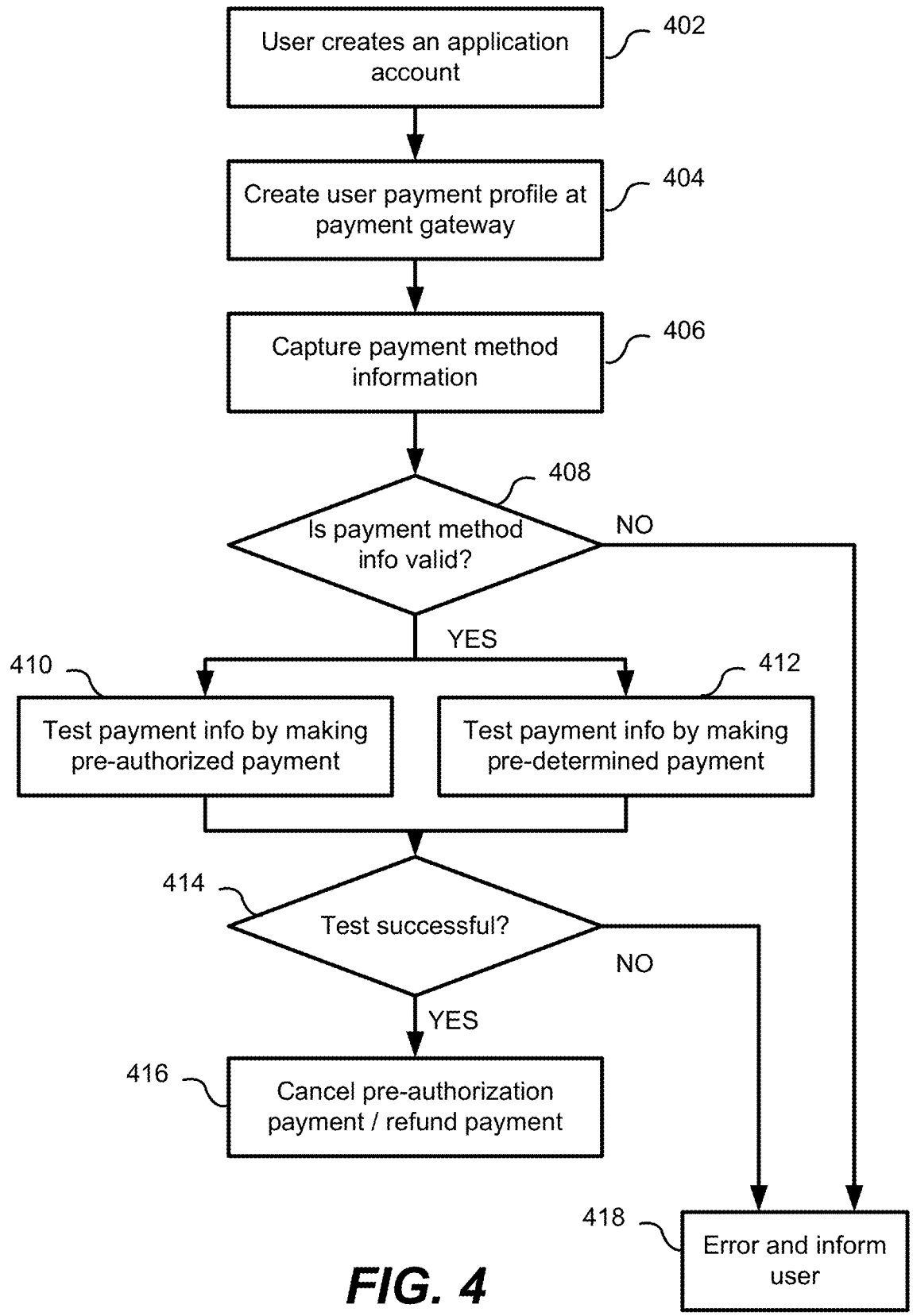
FIG. 4 shows a method of how a profile for a user of the mobile application is created.

FIG. 4 shows a method of how a profile for a user of the mobile application is created. A user creates an account for the mobile application (402). The application backend 240 may receive user profile information that the user has provided upon creation of the account, such as user sign-in information (username and password, or sign-in with social media account, etc.), and user information such as name, age, date of birth, email address, phone number, etc.

A user payment profile corresponding to a digital wallet is created at the payment gateway (404). The application backend 240 may communicate some of the user profile information to the payment gateway 250 for use in creating the payment profile. Payment method information for the user is captured (406). The payment method information may for example comprise traditional payment means such as a credit/debit card number and expiration date, as well as more non-traditional payment means such as crypto currencies (Bitcoin, Etherium, etc.) and/or physical assets that the customer may be willing to part with as payments or payment collaterals (e.g. cars, bikes, houses, furniture, canned food, cellphone, laptops, etc.). A determination is made if the payment method information is valid (408). For example, a logical and semantical validation such as the number of characters in the credit card number or the expiration date may be used to validate the payment method information. If the payment method information is not valid (NO at 408), the application backend returns an error and informs the user (418).

If the payment method information is valid (YES at 408), the payment information is tested by making either a pre-authorized payment (410) or a pre-determined payment (412). Note that certain types of payment information such as physical assets added by the user may not provide the ability to be validated/tested, however the registration of a physical asset with the application nonetheless provides recourse for an establishment should a customer attempt to avoid payment. A determination is made if the test of payment information is successful (414). If the test is successful (YES at 414) the pre-authorization payment is cancelled and/or the pre-determined payment is refunded (416). If the test is not successful (NO at 414) the application backend returns an error and informs the user (418).

Figure 5:
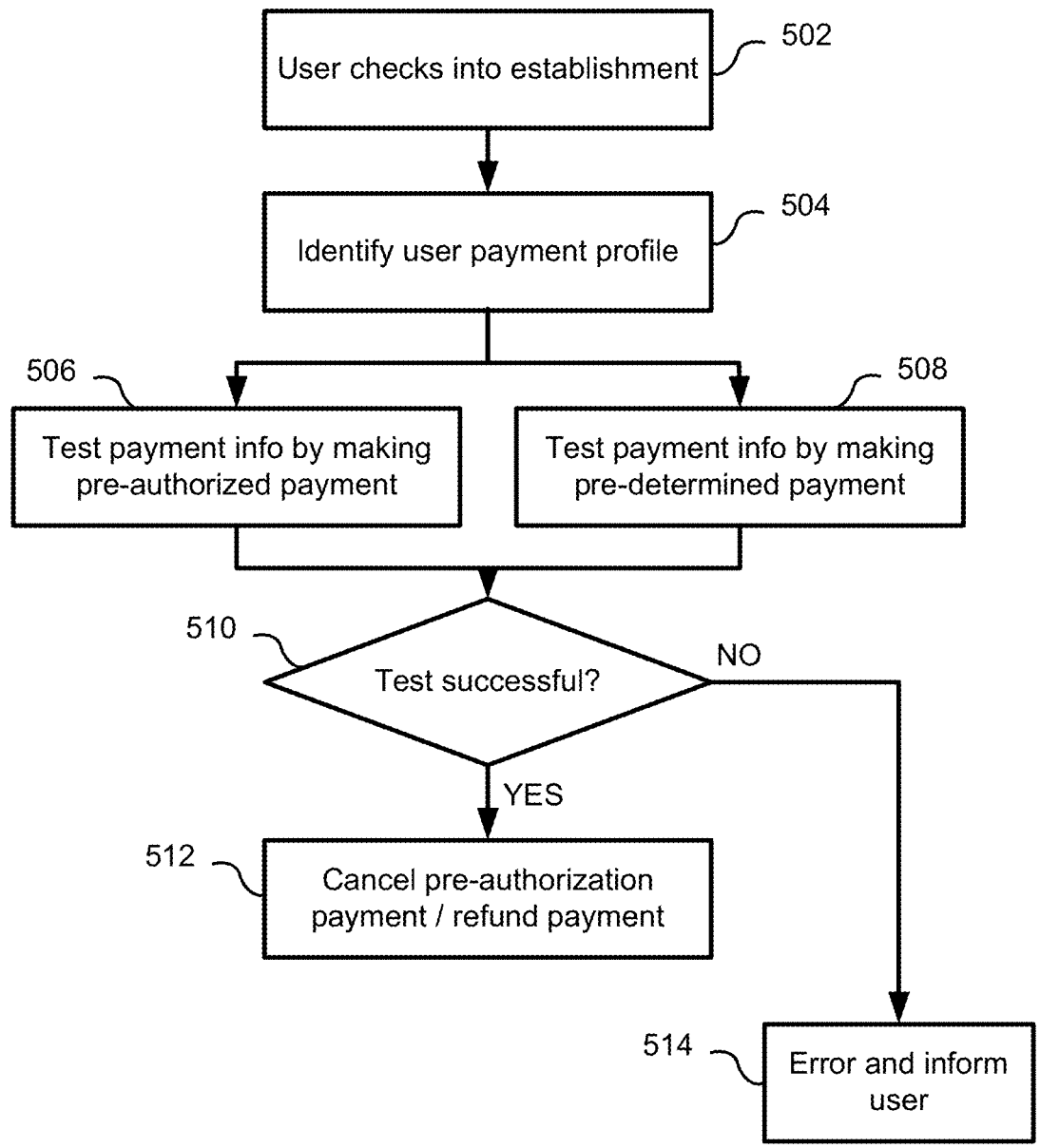
FIG. 5 shows a method of testing payment information when a user checks into an establishment.

FIG. 5 shows a method of testing payment information when a user checks into an establishment. Each time that a user of the mobile application checks into an establishment the payment information associated with the user account may be verified. This way, if a user chooses to initiate bill settlement at the end of their visit by walking out of the establishment, the application backend can confirm before the user orders goods/services that the payment information is still valid and can be used to charge the user for any goods/services ordered.

It is determined that the user checks into an establishment (502). The user payment profile is identified (504). Using the payment information associated with the user payment profile, the payment information is tested by making one of a pre-authorized payment (506) or a pre-determined payment (508). A determination is made if the test is successful (510). If the test is successful (YES at 510) the pre-authorization payment is cancelled and/or the pre-determined payment is refunded (512). If the test is not successful (NO at 510) the application backend returns an error and informs the user (514). In some instances, the user may also be flagged for attempting to use the service without being able to pay or having invalid payment information, and the user may be prevented from using the service until a valid form of payment is added.

Figure 6:
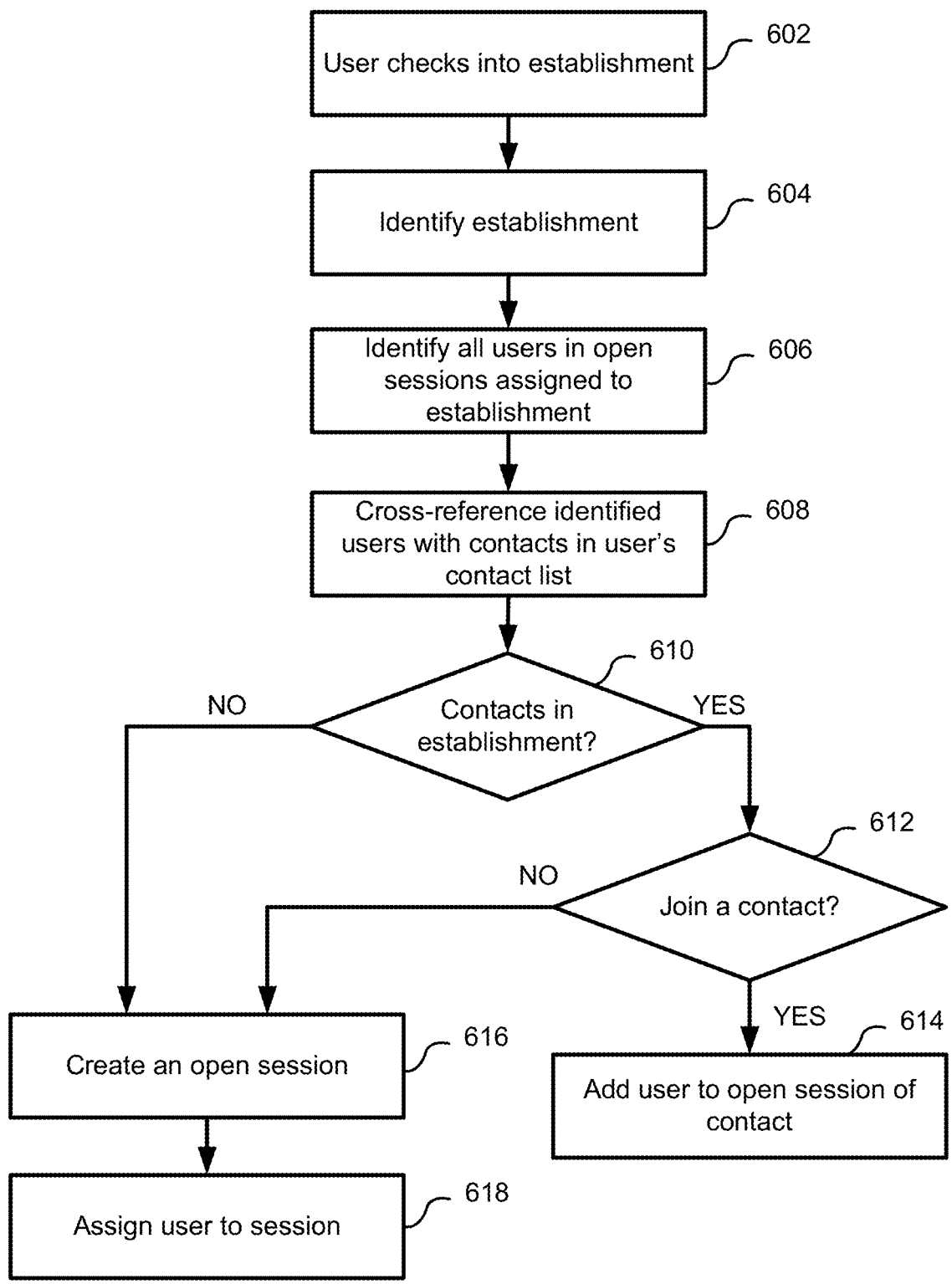
FIG. 6 shows a method of assigning the user to a session when a user checks-in at an establishment.

FIG. 6 shows a method of assigning the user to a session when a user checks-in at an establishment. It is determined that the user checks into an establishment (602). The establishment is identified (604). For example, the establishment may be identified from check-in information inputted into the application by the user. Additionally or alternatively, the establishment may be identified by the location of the user's electronic device running the application.

The application backend identifies all users in open sessions assigned to that establishd (606). The PoS system may be queried to determine all the users in open sessions at the restaurant. The contact list of the user that has checked-in is cross-referenced against the identified users in open sessions assigned to that establishment (608). A determination is made if there are contacts of the user assigned to an open session at the establishment (610). If there is a contact of the user assigned to an open session at the establishment (YES at 610) the user is presented with an option to join the contact (612). If the user wishes to join the contact (YES at 612) the user is added to the open session of the contact (614). If the user does not wish to join the contact (NO at 612) the application backend creates an open session in the PoS system (616) and the user is assigned to the open session (618). If there is not a contact of the user assigned to an open session at the establishment (NO at 610) the application backend creates an open session in the PoS system (616) and the user is assigned to the open session (618).

Each session may be associated with a user's application tag for use by the application backend 240 to correlate the session with the user's profile, and a check ID/seat number for use by the establishment employee to enter the order information. When the application backend opens a session for a user, the user's name may be provided to the PoS so that the establishment employee can associate the user's session with the check ID/seat number.

The above-described method provides a particular implementation of assigning a user to a session at the establishment upon check-in that involves cross-referencing contact information with users in open sessions assigned to the establishment. It would be well appreciated that this method could be modified without departing from the scope of this disclosure. For example, in some embodiments a user may simply be assigned to an open session without the application backend checking for contacts at the establishment. In some embodiments a user may have to indicate that there are contacts at the establishment with whom they wish to join for the backend to retrieve users in open sessions at the establishment.

In still further embodiments, a user may join friends at an establishment by the backend providing the user with a full list of application users at the establishment, however the user may only see unmasked names if that user has been at a table with the user before or if the phone number associated with that user profile is in the user's contact list or the email associated to their user profile is in the user's contact list. Otherwise the user may only see the masked name, which might only displays that user's initials for example. With such a feature, if a user is joining someone that works with them, or someone that they don't know very well, the user may not have their phone number and may not have been at a table with them before. The user may then look for that person's initials in the masked list of names, and may still join them without compromising the privacy of the rest of the guests that are at the establishment that are also not in the user's contact list.

Figure 7:
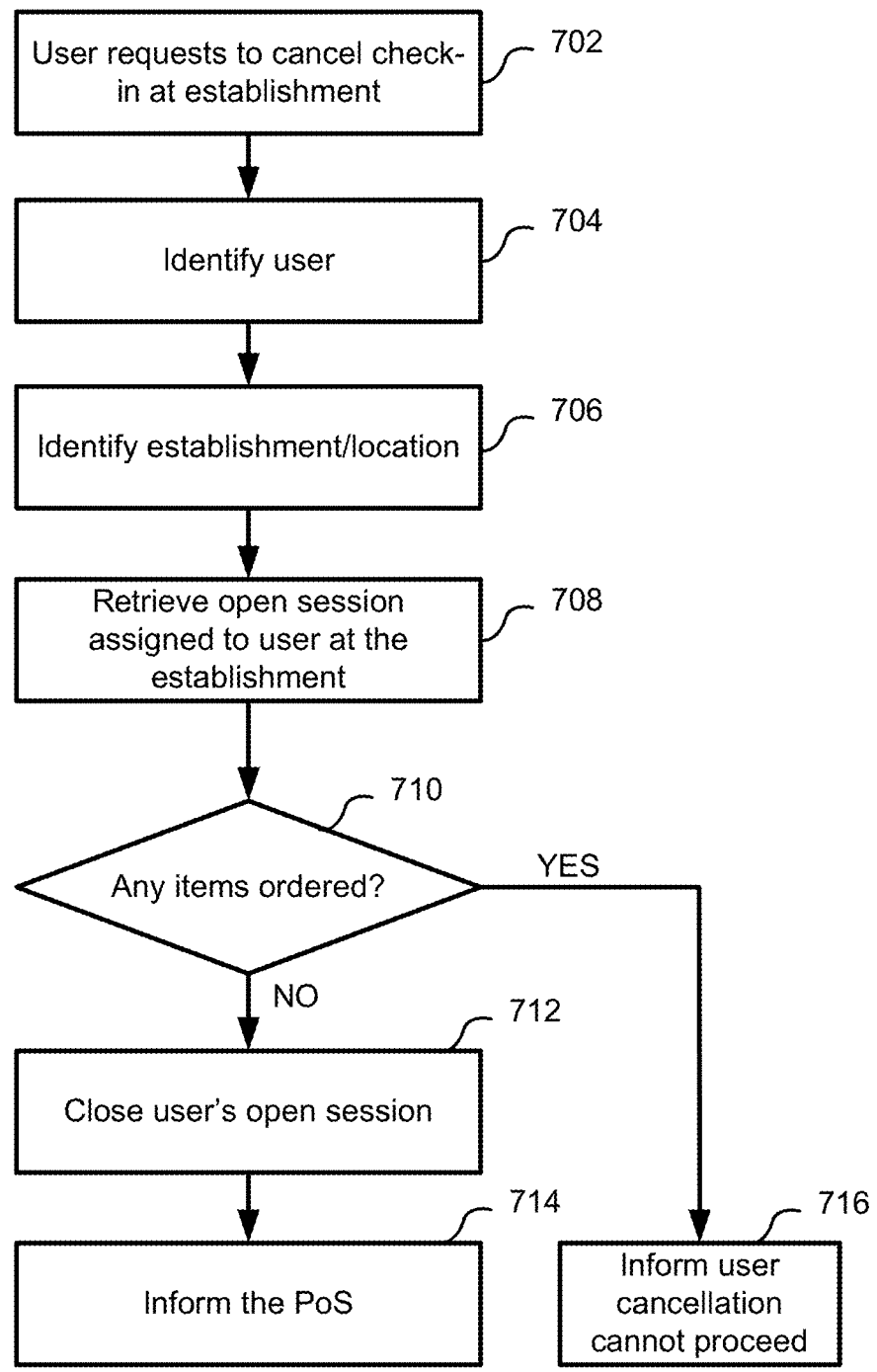
FIG. 7 shows a method of responding to a request by a user to cancel a check-in at an establishment.

FIG. 7 shows a method of responding to a request by a user to cancel a check-in at an establishment. The application backend receives a user request to cancel a check-in at an establishment (702). The user is identified (704) and the establishment is identified (706). Information from the open session assigned to the user at the established is retrieved from the PoS system at the establishment (708). A determination is made if any items are ordered (710). If no items have been ordered (NO at 710), the open session assigned to the user is closed (712) and the PoS is informed (714). If items have been ordered by the user (YES at 710) the user is informed that cancellation cannot proceed (716).

In some embodiments, the user may also be able to cancel check-in externally, for example by informing the staff at the establishment that they have checked-in to the establishment using the application but wish to cancel their check-in. The establishment employee may then close the session at the PoS. The application backend would thus be unable to retrieve an open session assigned to the user at the establishment.

Figure 8A:
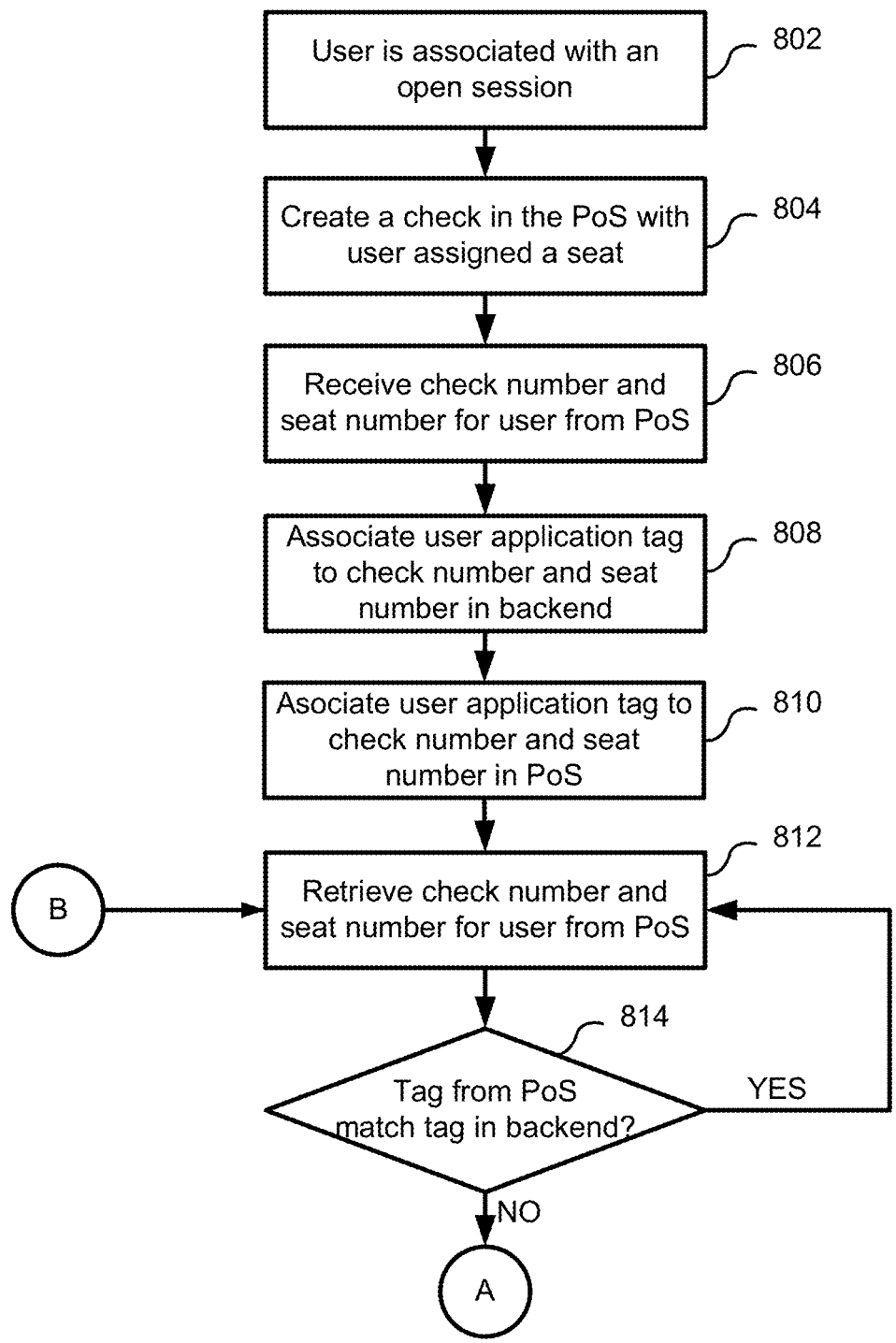
FIGS. 8A and 8B show a method for tracking a user's order while at an establishment.
Figure 8B:
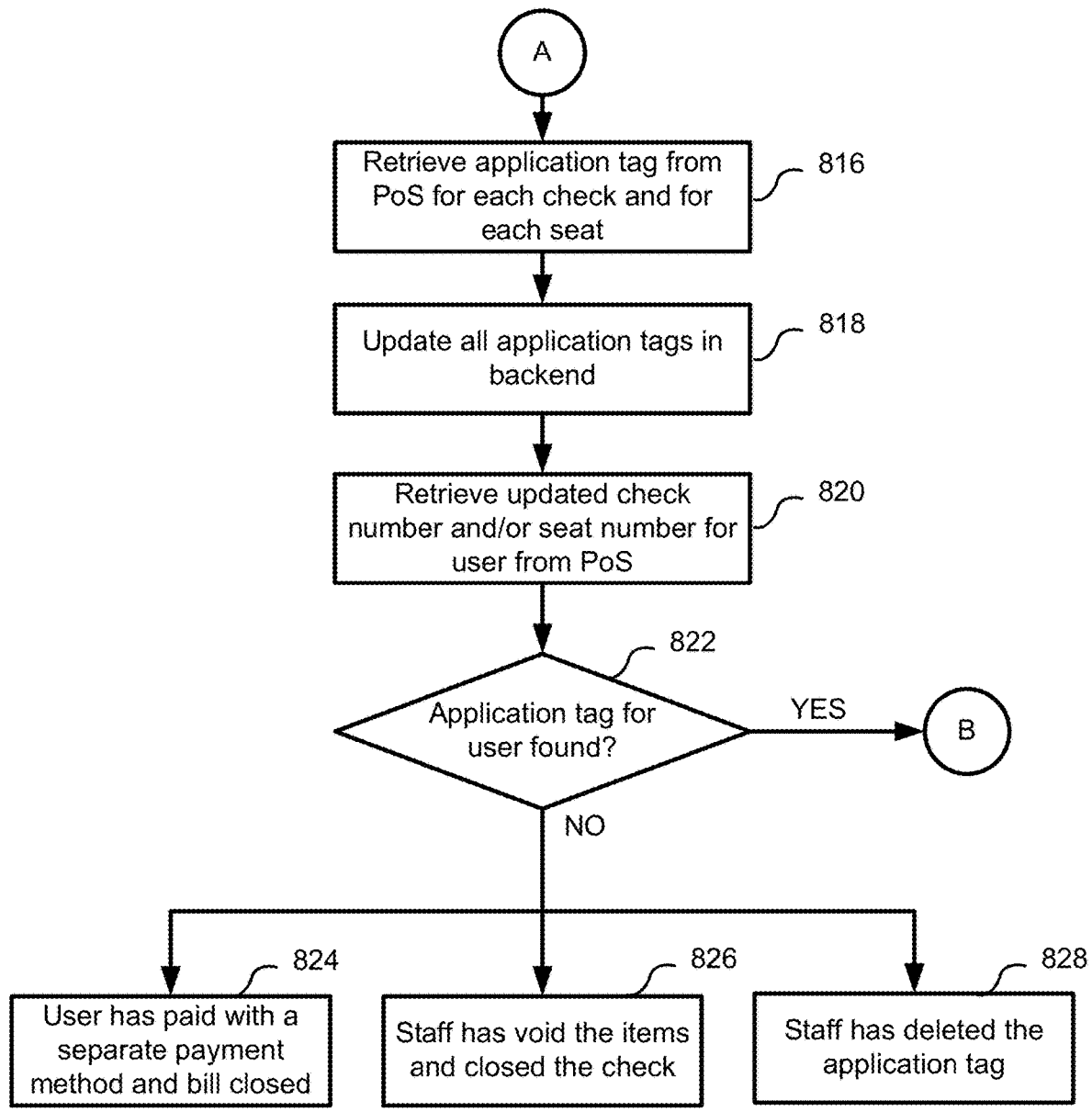

FIGS. 8A and 8B show a method for tracking a user's order while at an establishment. In particular, in some instances a user of the mobile application may change seats and/or tables while at the establishment (such as in the case of restaurants). The establishment staff may manually update the PoS accordingly, however the application tag assigned by the application backend to the respective open session may not be updated. As such, the application backend must find the correct open session to reassign the application tag for the user.

A user is associated with an open session (802). A check is created in the PoS with the user assigned a seat (and/or a table, and/or a different type of identifier depending on the establishment and the PoS system) (804). The check number and seat number for the user is received from the PoS (806). The user's application tag is associated in the backend to the check number and seat number (808). The user's application tag is also associated to the check number and seat number in the PoS (810).

The check number and seat number for the user is retrieved from the PoS (812). Such retrieval may be performed periodically at predetermined time intervals, or in response to certain events such as a user requesting to view their bill, the user requesting to settle their bill, etc. A determination is made if the user's tag assigned to the check and seat number in the PoS matches the user tag assigned to the check and seat number in the backend (814). If there is a match (YES at 814), it may be determined that the user has not moved tables/seats, and returns to retrieving the check number and seat number for the user (812) at the next predetermined time or next event.

If the user's tag for the check and seat number in the PoS does not match the user's tag in the backend (NO at 814), the backend retrieves all application tags from PoS associated with each check and for each seat number (816). All application tags are updated in the backend with the most recently retrieved check and seat number (818). The updated check number and seat number associated with the user's application tag is retrieved from the PoS (820). A determination is made if the application tag for the user is found (822). If the application tag for the user is found (YES at 822), the check number and seat number for the user is retrieved from the PoS (812) to confirm that the user's tag assigned to the check and seat number in the PoS matches the user tag assigned to the check and seat number in the backend (814). If the application tag for the user is not found (NO at 822), this suggests that the user has paid with a separate payment and the bill has been closed at the PoS by the establishment staff (824), that the staff has void the items ordered by the user and closed the check (826), or that the staff has deleted the application tag at the PoS system (828).

Figure 9A:
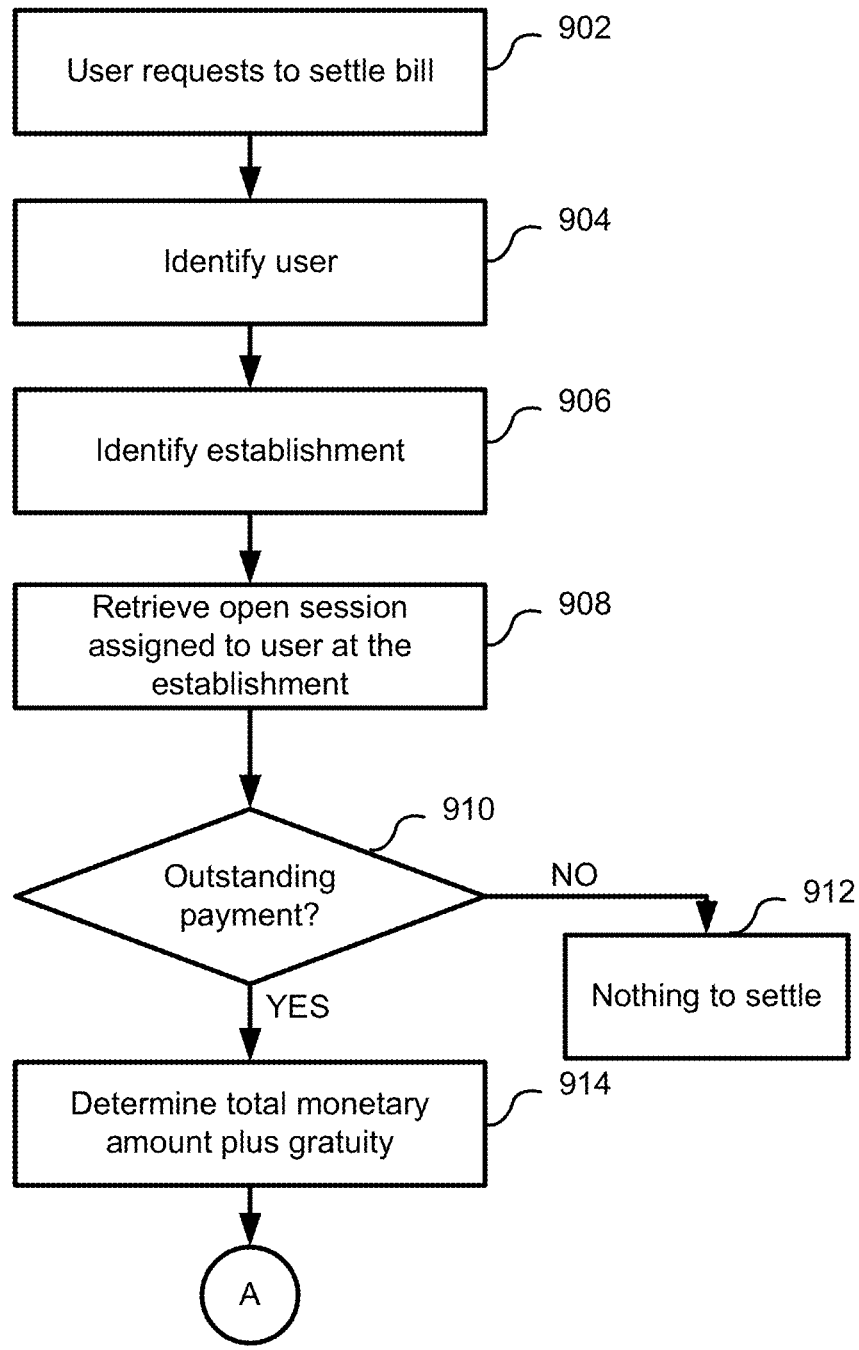
FIGS. 9A and 9B show a method of remotely processing a user's payment at an establishment.
Figure 9B:
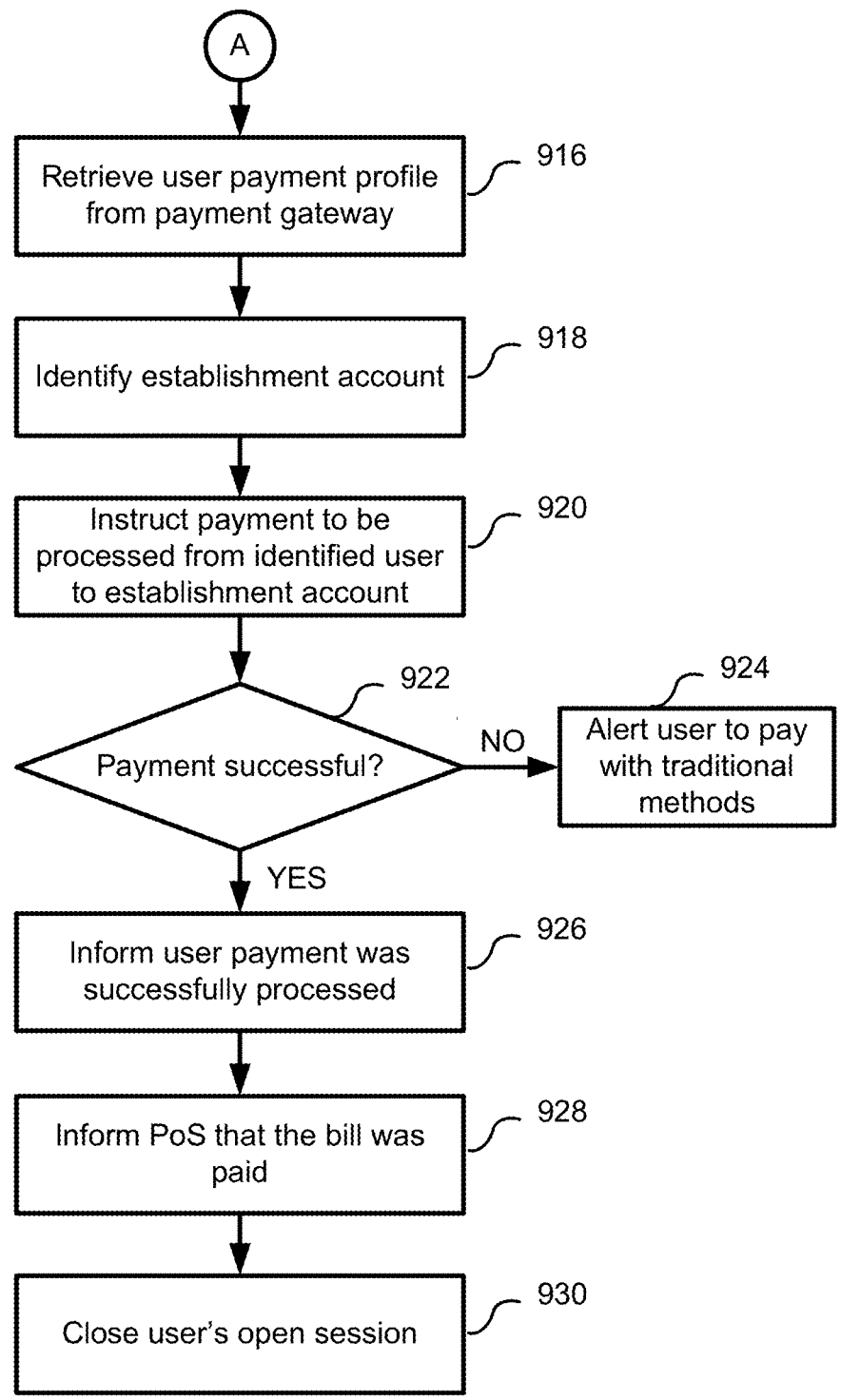

FIGS. 9A and 9B show a method of remotely processing a user's payment at an establishment. A user requests to settle their bill (902). The user is identified (904) and the establishment is identified (906). The backend retrieves the open session from the PoS assigned to the user at the establishment (908). In some implementations, the open session assigned to the user may be all open sessions associated with an identification equipment that was scanned or tapped by the user, from which the user can then select their bill. A determination is made if there is an outstanding payment for the goods/services ordered by the user (910). If there is no outstanding payment (NO at 910), the user is informed that there is nothing for the user to settle (912).

If there is an outstanding payment for the goods/services ordered by the user (YES at 910), a total monetary amount for the goods/services plus any gratuity is determined (914). A default gratuity may be added that the user can modify, or the user may be able to input the gratuity. The user payment profile is retrieved from the payment gateway (916). The establishment account stored in the payment gateway is identified (918). The backend instructs the payment gateway to process the payment by charging the user a payment for the goods/services to settle the bill and to deposit the payment in the establishment account (920).

A determination is made if the payment successful (922). If the payment is unsuccessful (NO at 922), the user is alerted to pay the establishment with traditional methods (e.g. cash, credit card at a payment terminal) (924). If the payment is successful (YES at 922), the user is notified that the payment was processed (926). The backend informs the PoS that the bill was paid (928) and the user's open session is closed (930). The user may also be e-mailed a receipt or have a receipt pushed to the application on their mobile device, for example.

Figure 10:
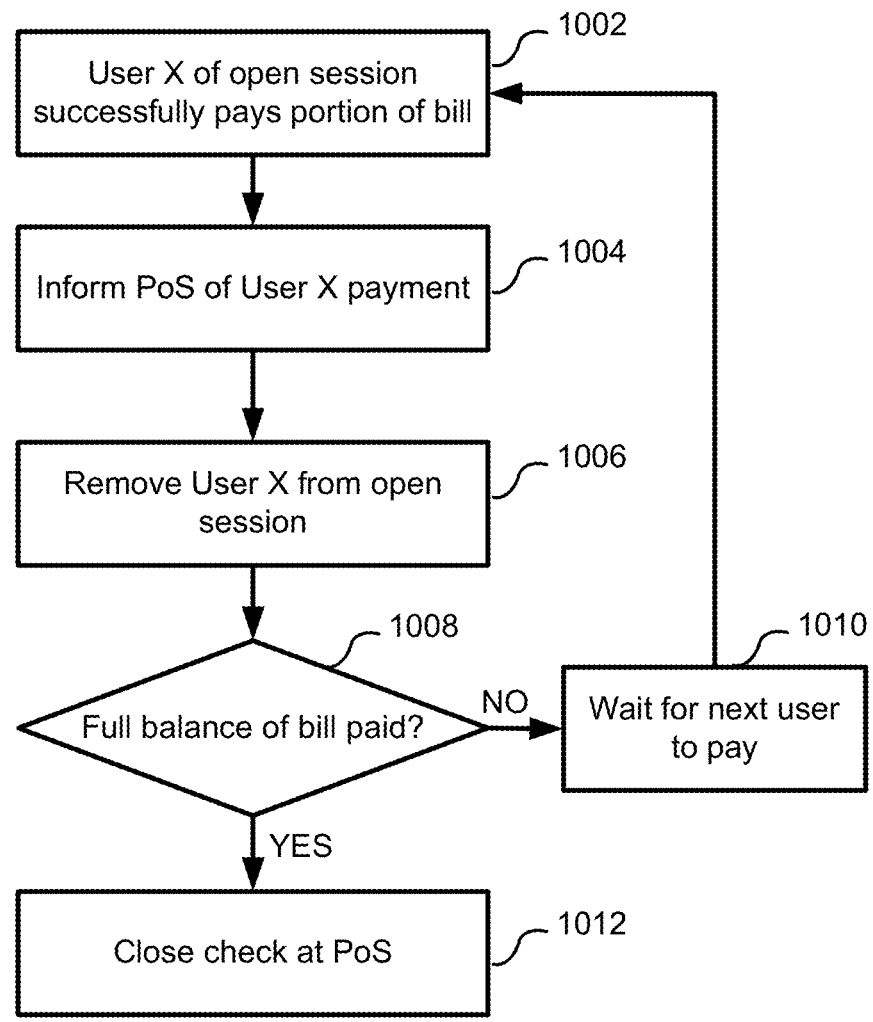
FIG. 10 shows a method of processing a collaborative bill payment.

FIG. 10 shows a method of processing a collaborative bill payment. Where an open session has more than one user that are splitting a check the application backend processes payments from each of the users. Splitting a check may be indicated by instructing the establishment employee to put different items and/or splitting items between different seats/guests. Users of the mobile application may then see their own portion of the bill and will pay for that portion. Additionally or alternatively, users of the mobile application may themselves manage who pays for what. For example, people assigned to the same table using the mobile application may be able to send items to each other or portions of items to each other. For example, a first guest at a restaurant that is a user of the mobile application may order a chicken burger, chicken fingers, and one bottle of wine. Through the mobile application the user may send the chicken burger to a second guest and a half of the bottle of wine to a third guest seated at the same table. The second and third guests can accept the items sent through the mobile application, and will then be responsible to pay for them. Accordingly, when splitting a check the establishment staff may distribute items in a certain way and users of the application may modify the distribution. In some embodiments the application may provide a quick split functionality that allows all items to be split equally amongst the users.

A first user of the open session successfully pays their portion of the bill (1002). That is, the backend instructs the payment gateway to charge the first user a payment corresponding to their portion of the bill and the payment is successful. The PoS is informed of the first user's payment (1004) and the first user is removed from the open session at the PoS (1006).

A determination is made if the full balance of the bill has been paid (1008). If the full balance has not been paid, the backend waits for a next user (e.g. a second user) of the open session to pay (1010) and the backend instructs the payment gateway to change the second user a payment corresponding to their portion of the bill. Waiting for the next user to pay may comprise waiting to receive an indication from a user of the open session that they wish to settle their bill. Where a user has left the establishment without settling their bill, then the backend forces the user to pay. The second user of the open session successfully pays their portion of the bill (1002), the PoS is informed of the second user's payment (1004), and the second user is removed from the open session at the PoS (1006). When the full balance of the bill has been paid (YES at 1008), the check at the PoS is closed (1012). The users may also be e-mailed a receipt, for example.

The above-described method provides a particular implementation of bill splitting where each of the customers assigned to the open session are users of the application. In some embodiments, the customers assigned to the open session may comprise both users of the application and non-users of the application. Each guest pays for their portion of the bill. Non-users of the application may pay for their portion of the bill using traditional methods and/or via the webpage, while users of the application can pay for their portion in accordance with the embodiments disclosed herein (for example, leaving the establishment and being charged for their portion of the bill). When a bill comprises both users and non-users of the application, the establishment staff may distribute/split items between different seats/guests, while users of the application may modify the distribution of their portion by sending to other users of the application that are on the bill. The check at the PoS only closes once all items are paid for, regardless of how the items are distributed/split and who paid for what.

Figure 11A:
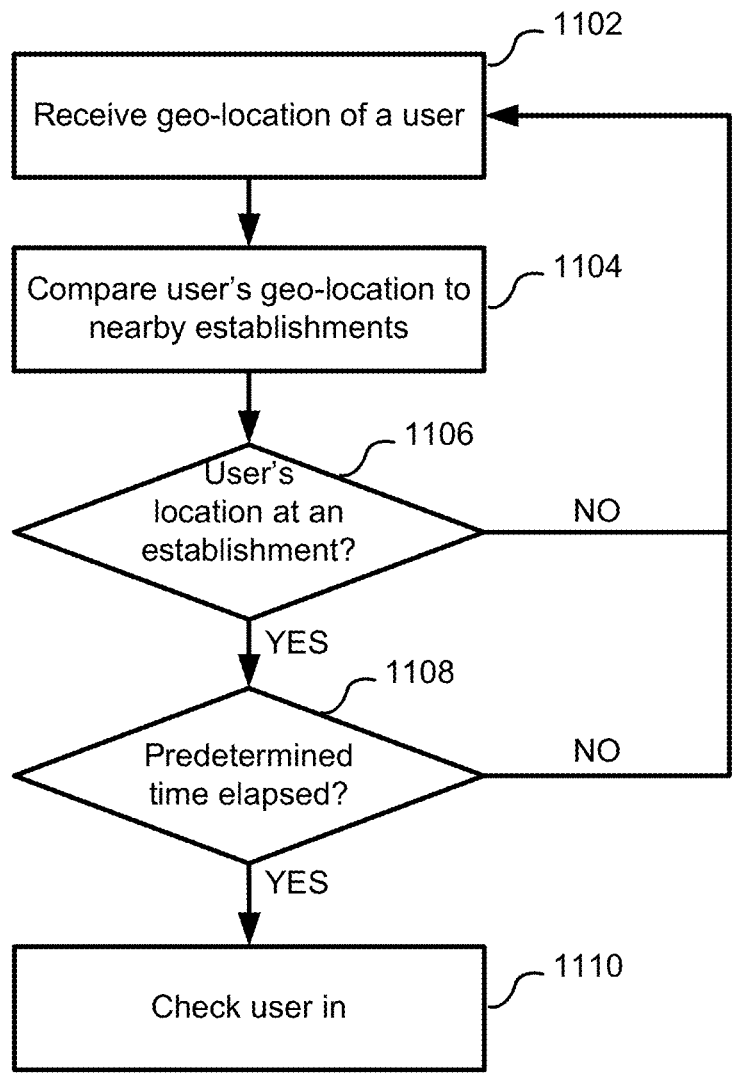
FIG. 11A shows a method of using a user's location to check-in at an establishment.

FIG. 11A shows a method of using a user's location to check-in at an establishment. A geo-location of the user is received (1102). For example, the application accesses a location of the user's electronic device and provides the location to the application backend. In some embodiments the user's location may be received at predetermined time intervals even when the user is not using the application. In some embodiments the user's location may be received when the user opens the application and/or is using the application. The user's geo-location is compared to nearby establishments (1104) and a determination is made if the user's location is at an establishment (1106). In some embodiments, the determination may be made based on whether the user's location is within a geo-fence of the establishment. If the user's location is not determined to be at an establishment (NO at 1106) the method returns to receiving the geo-location of the user (1102). If the user's location is determined to be at an establishment (YES at 1106) a determination is made as to whether a predetermined time has elapsed of the user's location being at the establishment (1108). If the predetermined time has not elapsed (NO at 1108) the method returns to receiving the geo-location of the user (1102). In this manner, if a user happens to be walking on a sidewalk in front of an establishment and passing by, the user will not be determined to have checked into the establishment. If the predetermined has elapsed where the user's location is determined to be at the establishment (YES at 1108) the user is checked into the establishment (1110).

As described with reference to FIG. 2, a geo-fence of the establishment and the predetermined time may be generic, or may be specifically configured for the establishment and stored with the establishment profile.

Figure 11B:
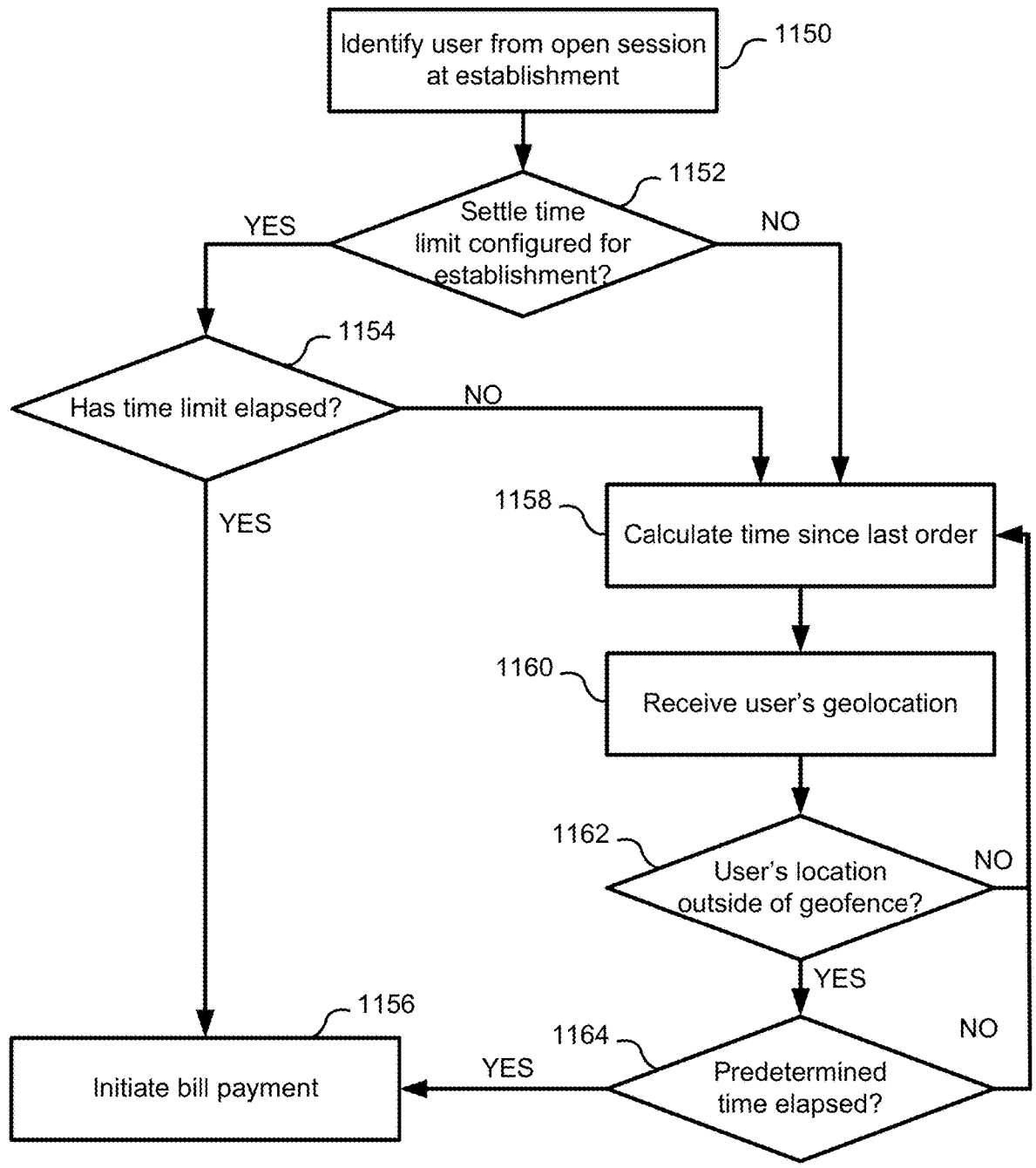
FIG. 11B shows a method of charging a user that has left an establishment before settling their bill.

FIG. 11B shows a method of charging a user that has left an establishment before settling their bill. A user is identified from an open session at the establishment (1150). A determination is made if a settlement time limit has been configured for the establishment (1152). For example, a time settlement limit may be set for 2 hours from last item ordered. If a time settlement time limit has been configured (YES at 1152), a determination is made as to whether the time limit for the open session has elapsed (1154). If the time limit has elapsed (YES at 1154), the application backend initiates bill payment (1156) by charging the user via the payment gateway.

If there is no settlement time limit configured for the establishment (NO at 1152) or if there is a settlement time limit but the time limit has not elapsed (NO at 1154) a time since the user's last order is calculated (1158). The user's geolocation is also determined/received (1160). A determination is made if the user's location is outside of a geo-fence of the establishment (1162). If the user's location is outside a geo-fence of the establishment (YES at 1162), a determination is made if a predetermined time has elapsed (1164). If a predetermined time has elapsed (YES at 1164), or in other words, if the user is outside of the establishment's geo-fence and it has been some time since the user's last order, bill payment is initiated (1156) because it appears that the user has left the establishment's location. If the user's location has remained inside the geo-fence (NO at 1162) or a predetermined time since the last order has not elapsed (NO at 1164), the method returns to monitoring the time since the user's last order (1158). In this manner, if the user is at an establishment but has to return to their car in the middle of a meal, for example, the bill payment will not be initiated. In some embodiments, the user may also be determined to have left the establishment and bill payment should be initiated if the user's location is outside of the establishment's geo-fence for a predetermined time (not necessarily considering the time since the last order).

Figure 12:
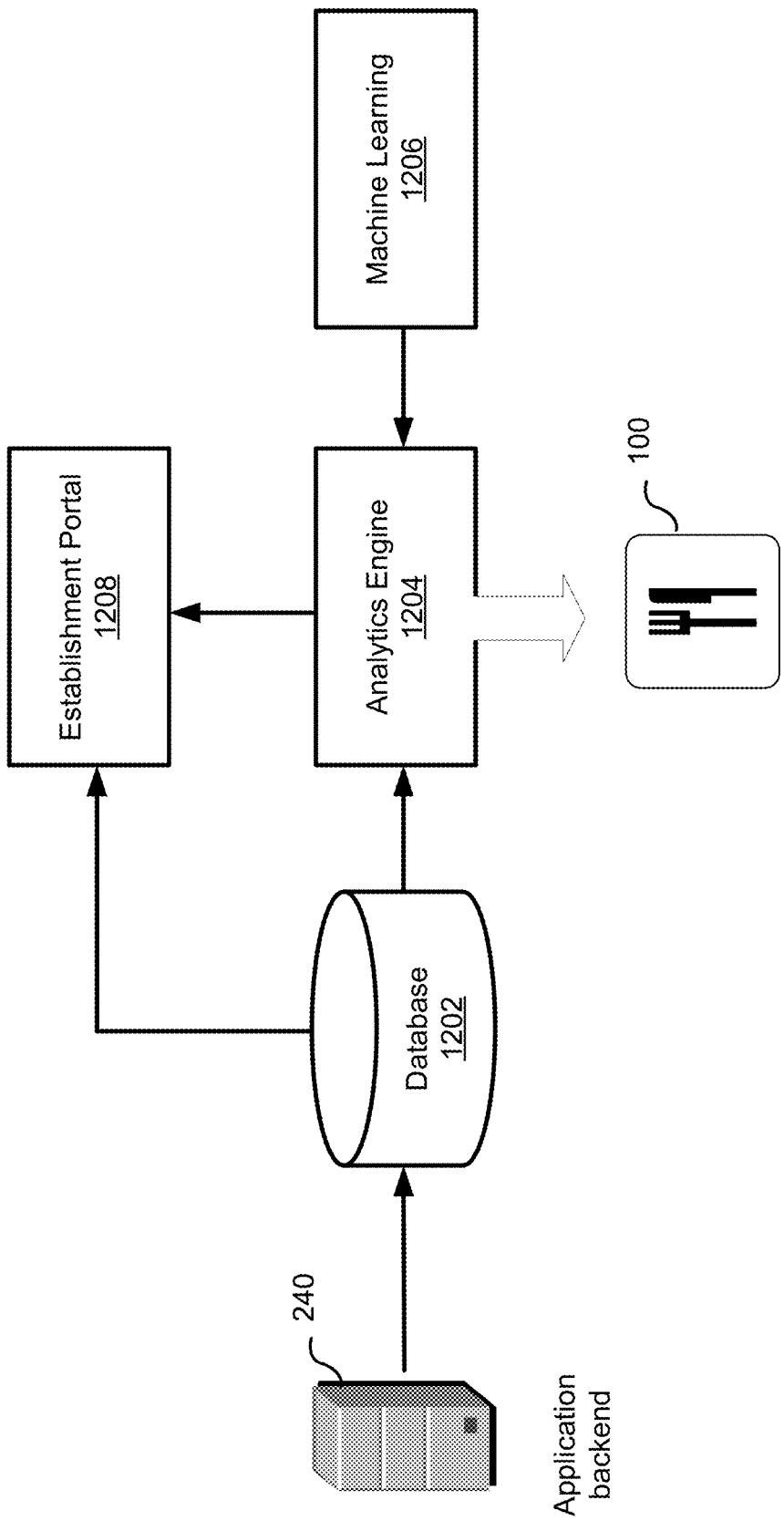
FIG. 12 shows a system for analyzing transaction data.

FIG. 12 shows a system for analyzing transaction data. Data from the application backend 240 is fed into a database 1202. Data in the database 1202 may be transformed, anonymized, and indexed. Certain data in the database 1202 may be accessible to establishment owners 100 via an establishment portal 1208. Analytics engine 1204 is configured to access the database 1202 and execute various algorithms on the data such as anomaly detection, forecasting, sentiment analysis, etc., to produce meaningful analytics for the establishment. The analytics engine may invoke various machine learning technologies such as IBM Watson™, Spark ML™, TensorFLow™, or DataBricks™ to create and train the algorithms for use in the analytics engine. The results of the analytics is provided to the establishment portal 1208, which may be an access-controlled UI.

In one non-limiting example implementation, the database 1202 may for example be a Mongo™ database. The oplogs and changelogs from the database may be read and put in an Elasticsearch™ cluster (in Elastic Cloud™ or in an AWS™ Elastic Service for example) for quick access indexed search. The data may be curated and transformed based on the different use cases (for example anomaly detection, forecasting and sentiment analysis). That data would be fed to the analytics engine 1204 for the algorithms to run according to the use cases.

Figure 13:
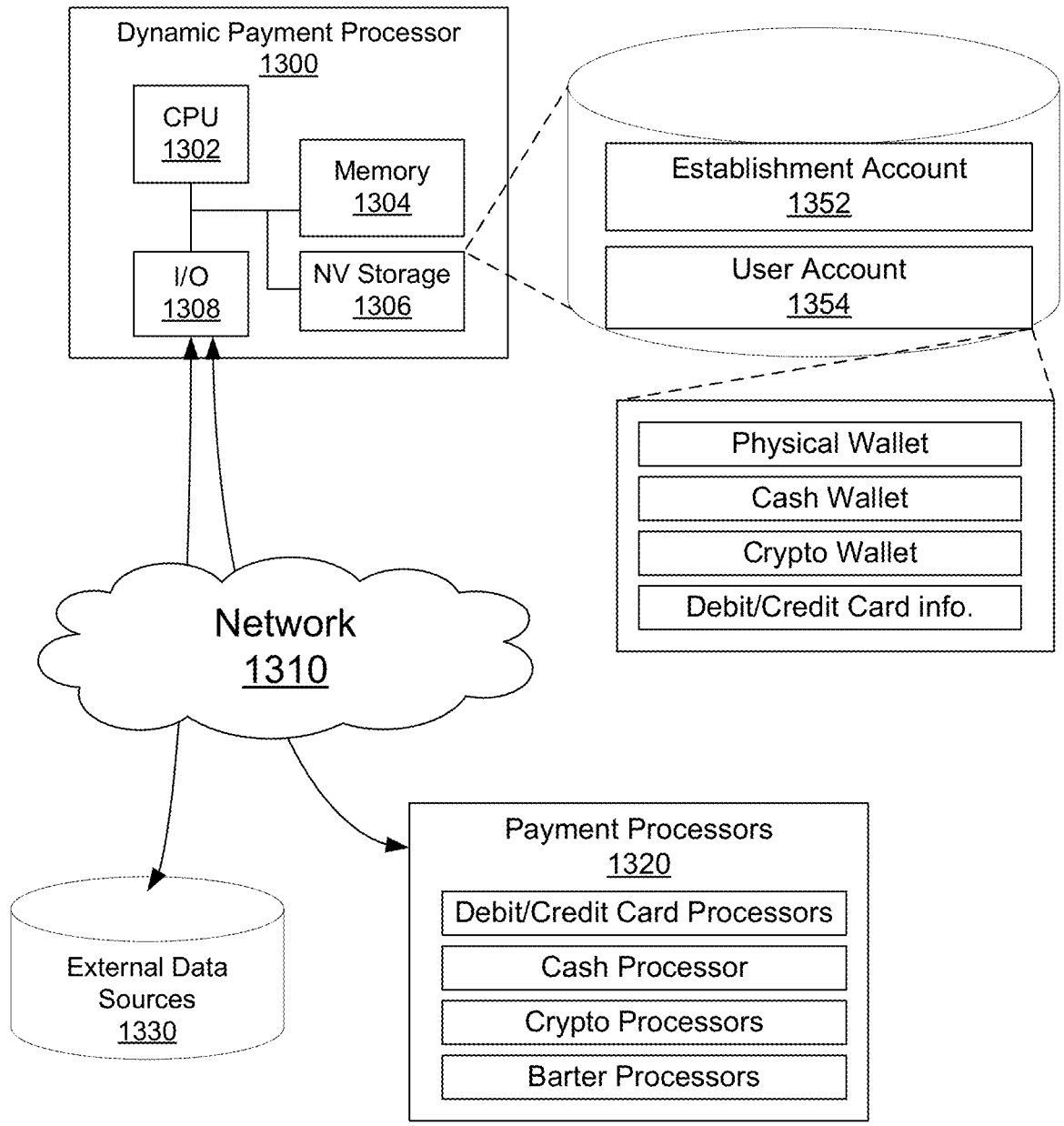
FIG. 13 shows a representation of a dynamic payment processor configured to process payments in real-time using a range of available payments.

FIG. 13 shows a representation of a dynamic payment processor configured to process payments in real-time using a range of available payments. The dynamic payment processor 1300 may be similar to the payment gateway 250 previously described with reference to FIG. 2 in that it stores establishment account information 1352 and user account information 1354, however instead of only being able to process traditional types of payment such as credit/debit card information, the dynamic payment processor 1300 is configured to process payments using various types of non-traditional assets such as crypto currencies, physical assets, etc., by assessing real-time exchange rates to determine the real-time value of the asset that the user wishes to pay with.

As shown in FIG. 13 the dynamic payment processor 1300 comprises a CPU 1302, a memory 1304, non-volatile storage 1306, and an input/output interface 1308. The memory 1304 comprises non-transitory computer-readable instructions stored thereon which, when executed by the CPU 1302, configure the dynamic payment processor 1300 to perform certain functionality for processing payments as disclosed herein. The non-volatile storage 1306 stores the establishment account information 1352 and the user account information 1354. The input/output interface 1308 provides a communication interface that allows the dynamic payment processor 1300 to communicate over network 1310 with one or more payment processors 1320 as well as one or more external data sources 1330.

As shown in FIG. 13, the user account information 1354 may comprise a digital wallet with various types of assets stored therein, and may for example comprise a physical wallet identifying physical assets (e.g. tuna cans, car tires, a bicycle, etc.) that the user is willing to part with, a cash wallet identifying cash that the user has on hand, a crypto wallet identifying cryptocurrencies that the user owns, and debit/credit card information providing debit/credit card details and/or payment profiles/tokens associated with the debit/credit card information.

The dynamic payment processor 1300 is configured to use the user account information 1354 and the establishment account information 1352, as well as external data sources 1330 as required, to facilitate payments between the user and the establishment using the available payment processors 1320. For example, in one exemplary use case a customer at an establishment who is using the application may state that he has a crate of tuna cans that they are willing to part with. A restaurant that has tuna melt sandwiches on their menu might be willing to accept tuna cans in exchange for prepared food and services. The market price for tuna is set at a certain rate, which can be looked up via the external data sources 1330. The user will add the tuna cans to their profile using the application, and the restaurant will update their account information to mark tuna cans as an accepted payment. The dynamic payment processor 1300 assesses the ongoing rate of tuna using the external data sources 1330 and transfers the ownership of the appropriate amount of tuna from the user to the restaurant to settle the user's bill. The external data sources 1330 may also comprise other helpful information for processing the payment such as country/legal limitations, etc. The dynamic payment processor 1300 may also be configured to handle crypto currency payments, application and/or restaurant rewards/points, as well as traditional payment means from debit cards, credit cards, cash transfer from bank accounts, etc. The dynamic payment processor 1300 may further be configured to process payments from several sources (e.g. cash, debit/credit, points, crypto) to settle a single bill payment.

Figure 14:
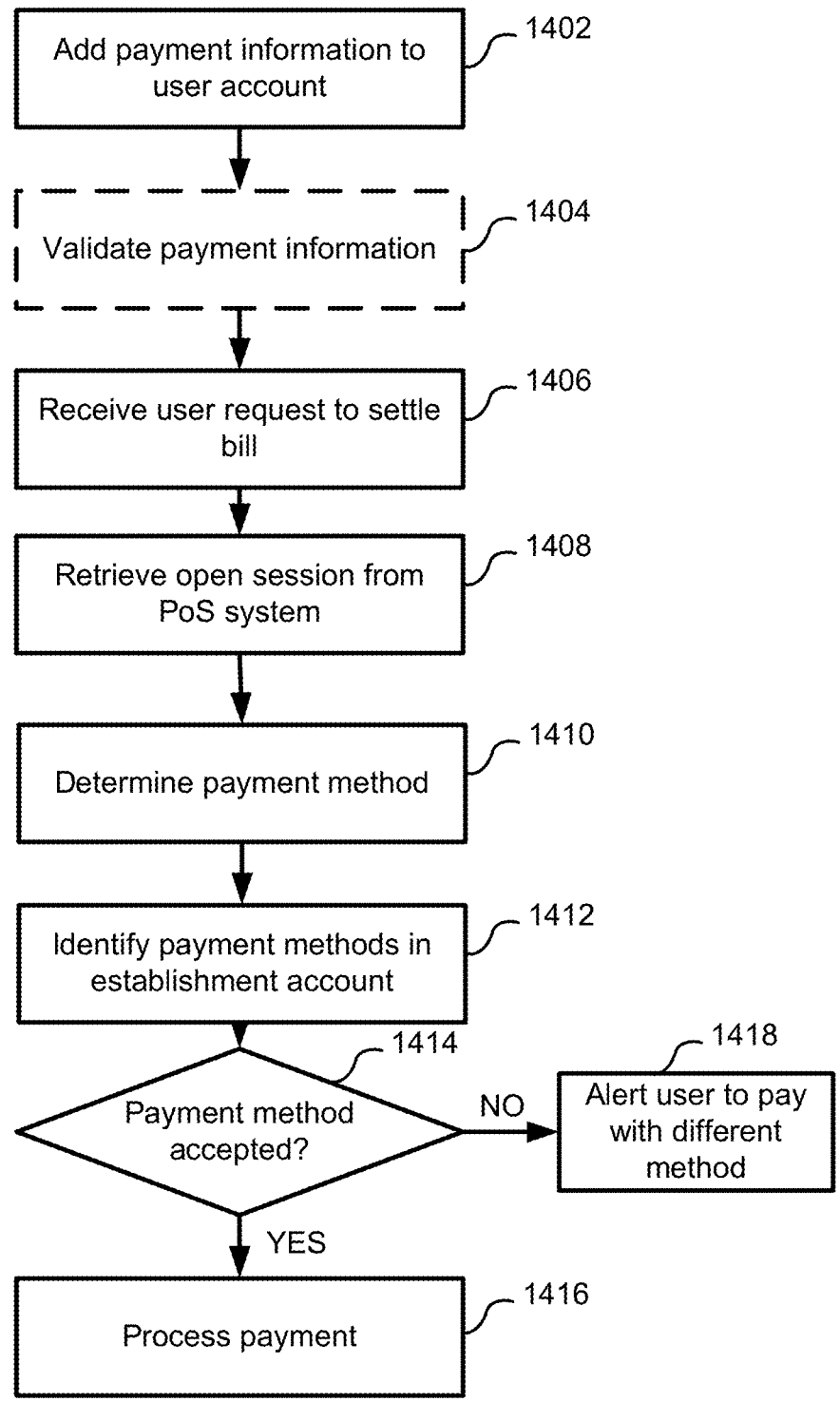
FIG. 14 shows a method of processing payments using the dynamic payment processor.

FIG. 14 shows a method of processing payments using the dynamic payment processor. The method comprises a user adding payment information to the user's account (1402). Where possible, the payment information is validated (1404), as previously described. A user request to settle their bill at an establishment is received (1406). The user and the establishment are identified, and the backend retrieves the open session from the PoS assigned to the user at the establishment and presents the bill to the user (1408).

The user may select a payment method from the payment information associated with the user's account (1410). The establishment account information is assessed to identify payment methods accepted by the establishment (1412). Note that the user may add a particular payment method to their user account, and the establishment may likewise update their establishment account to mark the payment method as an accepted payment, for example after the user discussing with the establishment. A determination is made as to whether the payment method selected by the user is accepted at the establishment (1414). If the user's selected payment method is accepted at the establishment (YES at 1414), the payment between the user and the establishment is processed (1416). Processing of the payment may involve looking up a real-time market price or exchange rate of the payment means. If the payment method is not accepted at the establishment (NO at 1414), the application notifies the user to select a different method of payment and/or to pay with traditional methods outside of the application (1418).

Note that in a further embodiment, the payment information associated with the user's account may be cross-referenced with the payment methods accepted at the establishment upon a user checking-in to the establishment and/or opening a session in the establishment PoS system. Cross-referencing the payment methods associated with the user account and the payment information accepted by the establishment may help to flag to the establishment if a user does not have assets in the digital wallet that are accepted by the establishment.

Figure 15:
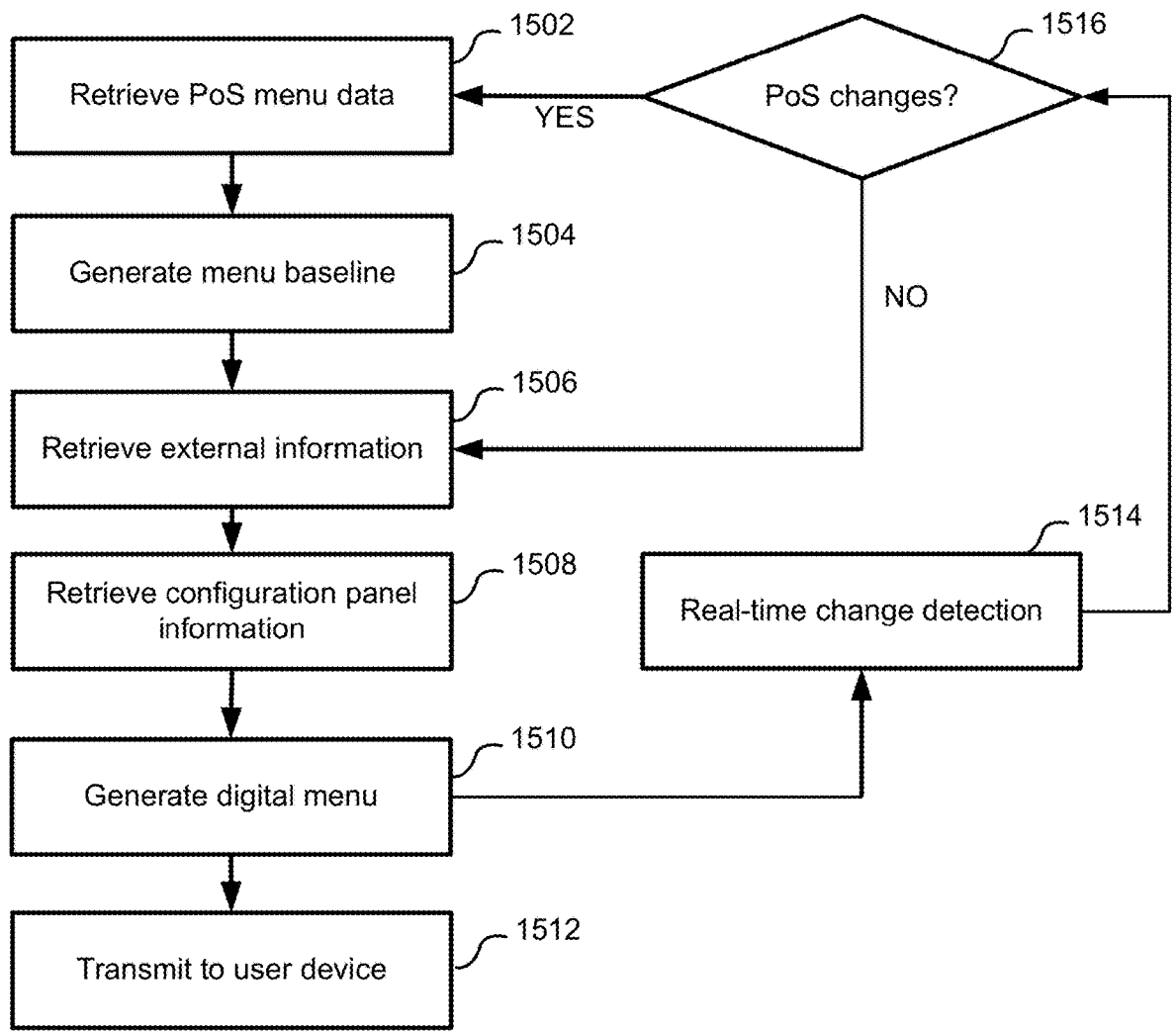
FIG. 15 shows a method of generating a dynamic menu from menu data obtained from an establishment's PoS system.

FIG. 15 shows a method of generating a dynamic menu from menu data obtained from an establishment's PoS system. The method comprises retrieving PoS menu data from the PoS system at the establishment (1502). The menu data may be retrieved directly from the PoS system using API calls, database lookups, or a combination thereof, as previously described. A menu baseline is generated from the menu data retrieved from the PoS system (1504). The menu baseline may comprise a preliminary digital menu populated with menu data obtained from the PoS such as the menu items, names, descriptions, prices, dependencies, combos, options, add ons, as well as any other relevant information on the POS. However the menu data from the PoS is missing certain supplemental information that should be present in a complete digital menu such as item pictures, alcohol warning and restrictions, allergy warning, ingredient labeling, and opening and closing times for the menu, etc. The menu data retrieved from the PoS system may comprise identifiers associated with certain menu data such as menu items that can be used for identifying and retrieving certain supplemental information relevant to the menu data. The supplemental information may be retrieved from external information that is retrieved from an external data source (1506). The supplemental information may additionally or alternatively be retrieved from configuration panel information (1508), which as previously described an establishment operator that is a client of the system may be provided with a configuration panel hosted by the application backend that allows the establishment operator to input relevant information for generating the dynamic menu and to provide input on what information is presented.

The digital menu is generated (1510) by combining the menu data retrieved from the PoS (e.g. populated in the menu baseline) with supplemental information which may comprise external information and/or configuration panel information. The digital menu is transmitted to a user device (1512) for presentation to a user of the application. From the digital menu on the user device the user may place an order, which can be directly updated in the PoS system by the application backend. The user's order may also be associated with location information, such as if a user scans a barcode, QR code, NFC tag, or other location identification equipment, and thus updating the PoS system with the user's order may comprise associating a table number and/or a seat number of the user with the user order.

The digital menu should be updated frequently and may be updated in real-time or near real-time, and therefore the method may comprise performing real-time change detection (1514) periodically (e.g. at predetermined frequencies upon expiry of a predetermined time period since the digital menu was previously generated) and/or upon receipt of a request from a user device to view the digital menu. The previously retrieved PoS menu data and/or the menu baseline may be stored locally at the application backend, and a determination may be made as to whether any changes have been made to the PoS menu data stored at the PoS system (1516). If no changes have been made (NO at 1516), the stored PoS menu data and/or menu baseline may be retrieved from local storage and the method continues with retrieving any supplemental information for generating the digital menu. If changes have been made to the PoS menu data (YES at 1516), the PoS menu data stored at the PoS system is retrieved. In some aspects, a user may be presented with the digital menu and certain interactions with the digital menu may trigger a request for additional supplemental information not currently presented and/or not previously retrieved. The real-time change detection may be used to dynamically retrieve the additional supplemental information for presentation to the user in the digital menu. For example, a user may click on a menu item within the digital menu and supplemental information such as nutritional facts and/or allergy warnings for example may be dynamically retrieved.

It would be appreciated by one of ordinary skill in the art that the system and components shown in FIGS. 2-15 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

The techniques of various embodiments may be implemented using software, hardware and/or a combination of software and hardware. Various embodiments are directed to apparatus, e.g. a node which may be used in a communications system or data storage system. Various embodiments are also directed to non-transitory machine, e.g., computer, readable medium, e.g., ROM, RAM, CDs, hard discs, etc., which include machine readable instructions for controlling a machine, e.g., processor. to implement one, more or all of the steps of the described method or methods.

The invention claimed is:

1. A system, comprising:
a communication interface for communicating via one or more communication networks;
a processing unit coupled to the communication interface; and
a memory storing non-transitory computer-readable instructions which, when executed by the processing unit, configure the system to:
communicate via the communication interface with an electronic device of a user located at an establishment and receive, from the electronic device, a location identifier;
communicate via the communication interface with a point-of-sale (PoS) system located at the establishment, the establishment being associated with the received location identifier and remotely located from the processing unit; and
in response to a trigger to dynamically generate a digital menu of the establishment,
retrieve menu data from the PoS system at the establishment via the communication interface by an application programming interface (API) associated with the PoS system;
retrieve, from one or more data sources external to the PoS system, supplemental information for the retrieved menu data associated with at least one item on the digital menu;
dynamically generate the digital menu based on combining the retrieved menu data and the supplemental information; and
after dynamically generating the digital menu, transmit, via the communication interface, the digital menu to the electronic device for display to the user;
receive, via the communication interface, a selection of one or more items on the digital menu from the electronic device;
transmit to the PoS system an identification of the selected one or more items with a user order associated with the user;
locally store, to the processing unit, a copy of the menu data obtained from the PoS system; and
periodically determine if there has been a change in the menu data at the PoS system relative to the menu data stored to the processing unit, wherein if there is no change in the menu data, retrieving the menu data from the PoS system comprises retrieving the menu data that is stored locally to the processing unit, and if there is a change in the menu data at the PoS system, retrieving the menu data from the PoS system comprises retrieving the changed menu data stored at the PoS system.

2. The system of claim 1, wherein the trigger to dynamically generate the digital menu is a request for the digital menu received from the electronic device of the user.

3. The system of claim 1, wherein the trigger to dynamically generate the digital menu is an expiry of a predetermined time period since the digital menu was previously generated.

4. The system of claim 1, wherein the supplemental information is provided by a client of the system.

5. The system of claim 1, wherein the system is further configured to:
receive location information associated with the user order, the location information identifying at least one of a table number and a seat number of the user, and
update the PoS system with the user order by associating the at least one of the table number and the seat number of the user with the user order.

6. The system of claim 1, wherein the system is further configured to:
receive a request from the electronic device of the user to settle a bill for the user order;
identify a user account corresponding to the user and an establishment account corresponding to the establishment;
retrieve session information from the PoS system at the establishment indicative of the bill for the user;
receive an indication of a payment method from the electronic device of the user;
determine if the payment method is accepted by the establishment based on the establishment account; and
process the payment from the user to the establishment with the payment method when it is determined that the payment method is accepted by the establishment.

7. A method, comprising:
receiving, via a communication interface of a computing system, from an electronic device of a user, a request to dynamically generate a digital menu of an establishment that is remotely located from the computing system;
in response to receiving the request to dynamically generate the menu of the establishment,
retrieving, via the communication interface, by an application programming interface (API) associated with a point-of-sale (PoS) system of the establishment, menu data from the PoS system;
retrieving, by the computing system, from one or more data sources external to the PoS system, supplemental information for the retrieved menu data associated with at least one item on the digital menu;
dynamically generating, by the computing system, the digital menu based on combining the retrieved menu data and the supplemental information; and
after dynamically generating the digital menu, transmitting, by the computing system, the digital menu to the electronic device for display to the user;
receiving, via the communication interface, from the electronic device, a selection of one or more items on the digital menu;
transmitting, by the computing system to the PoS system, an identification of the selected one or more items with a user order associated with the user;
locally storing, by the computing system, a copy of the menu data obtained from the PoS system; and
periodically determining if there has been a change in the menu data at the PoS system relative to the menu data stored by the computing system, wherein if there is no change in the menu data, retrieving the menu data from the PoS system comprises retrieving the menu data that is stored locally by the computing system, and if there is a change in the menu data at the PoS system, retrieving the menu data from the PoS system comprises retrieving the changed menu data stored at the PoS system.

8. The method of claim 7, further comprising receiving a trigger to dynamically generate the digital menu, wherein the trigger is an expiry of a predetermined time period since the digital menu was previously generated.

9. The method of claim 7, wherein the supplemental information is provided by a client computing device.

10. The method of claim 7, further comprising:
receiving location information associated with the user order, the location information identifying at least one of a table number and a seat number of the user, and updating the PoS system with the user order by associating the at least one of the table number and the seat number of the user with the user order.

11. A method, comprising:
receiving, via a communication interface of a computing system, from an electronic device of a user, a request to dynamically generate a digital menu of an establishment that is remotely located from the computing system;
in response to receiving the request to dynamically generate the menu of the establishment,
retrieving, via the communication interface, by an application programming interface (API) associated with a point-of-sale (PoS) system of the establishment, menu data from the PoS system;
retrieving, by the computing system, from one or more data sources external to the PoS system, supplemental information for the retrieved menu data associated with at least one item on the digital menu;
dynamically generating, by the computing system, the digital menu based on combining the retrieved menu data and the supplemental information; and
after dynamically generating the digital menu, transmitting, by the computing system, the digital menu to the electronic device for display to the user;
receiving, via the communication interface, from the electronic device, a selection of one or more items on the digital menu;
transmitting, by the computing system to the PoS system, an identification of the selected one or more items with a user order associated with the user;
receiving a request from the electronic device of the user to settle a bill for the user order;
identifying a user account corresponding to the user and an establishment account corresponding to the establishment;
retrieving session information from the PoS system at the establishment indicative of the bill for the user;
receiving an indication of a payment method from the electronic device of the user;
determining if the payment method is accepted by the establishment based on the establishment account; and
processing the payment from the user to the establishment with the payment method when it is determined that the payment method is accepted by the establishment.

* * * * *